(12) United States Patent
Sato et al.

(10) Patent No.: US 11,299,098 B2
(45) Date of Patent: Apr. 12, 2022

(54) VEHICULAR SLOPE APPARATUS

(71) Applicant: AISIN CORPORATION, Kariya (JP)

(72) Inventors: Eisuke Sato, Kariya (JP); Dai Hidaka, Kariya (JP)

(73) Assignee: AISIN CORPORATION, Kariya (JP)

( * ) Notice: Subject to any disclaimer, the term of this patent is extended or adjusted under 35 U.S.C. 154(b) by 290 days.

(21) Appl. No.: 16/601,885

(22) Filed: Oct. 15, 2019

(65) Prior Publication Data
US 2020/0122642 A1   Apr. 23, 2020

(30) Foreign Application Priority Data

| Oct. 17, 2018 | (JP) | JP2018-196141 |
| Mar. 27, 2019 | (JP) | JP2019-060670 |
| Sep. 12, 2019 | (JP) | JP2019-166372 |

(51) Int. Cl.
*B60R 3/02* (2006.01)
*A61G 3/06* (2006.01)

(52) U.S. Cl.
CPC ............... *B60R 3/02* (2013.01); *A61G 3/061* (2013.01)

(58) Field of Classification Search
CPC .................................. B60R 3/02; A61G 3/061
See application file for complete search history.

(56) References Cited

U.S. PATENT DOCUMENTS

| 5,775,232 | A | * | 7/1998 | Golemis | B61D 23/025 |
| | | | | | 105/458 |
| 6,010,298 | A | * | 1/2000 | Cohn | A61G 3/061 |
| | | | | | 414/522 |
| 6,186,733 | B1 | * | 2/2001 | Lewis | A61G 3/061 |
| | | | | | 414/537 |
| 6,210,098 | B1 | * | 4/2001 | Cohn | A61G 3/061 |
| | | | | | 414/537 |
| 6,409,458 | B1 | * | 6/2002 | Cohn | A61G 3/061 |
| | | | | | 14/71.1 |

FOREIGN PATENT DOCUMENTS

JP          2003-112578 A       4/2003

* cited by examiner

*Primary Examiner* — Bryan A Evans
(74) *Attorney, Agent, or Firm* — Oblon, McClelland, Maier & Neustadt, L.L.P.

(57) ABSTRACT

A vehicular slope apparatus includes: a slope plate deploying to a lower end of a door opening portion; a guide rail extending in a deploying and storing direction of the slope plate; a drive shoe moving in an extending direction of the guide rail; a link member having a first connection point rotatably connected to a rear end portion of the slope plate and a second connection point rotatably connected to the drive shoe; a posture holding mechanism configured such that the slope plate moves in the extending direction of the guide rail in conjunction with the drive shoe; and a lift mechanism configured to form a rotation fulcrum of the link member between the first and second connection points and to rotate the link member by changing an interval between the rotation fulcrum and the second connection point to thereby lift the rear end portion of the slope plate.

18 Claims, 23 Drawing Sheets

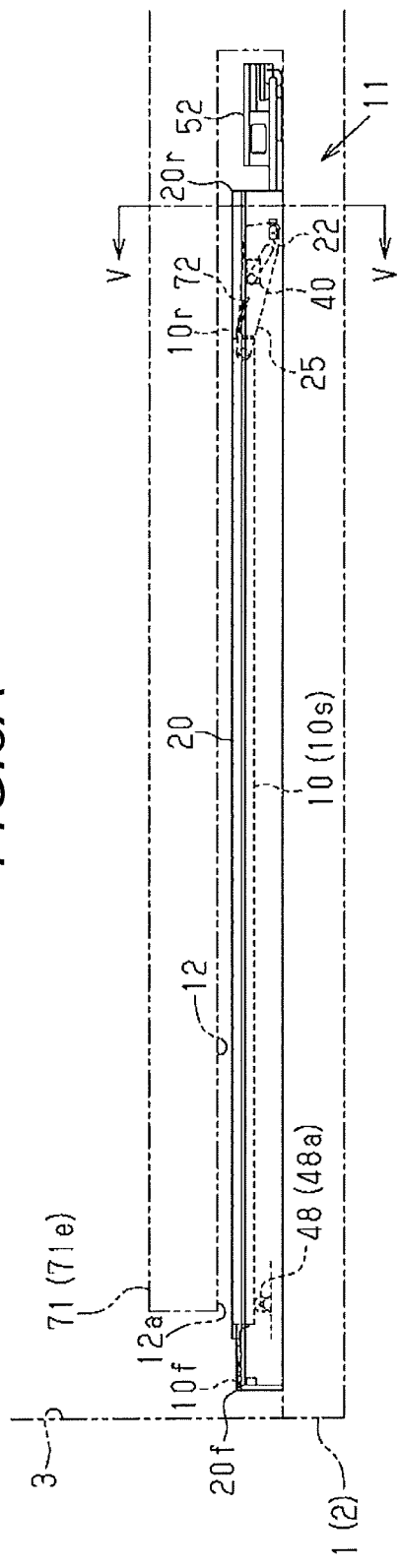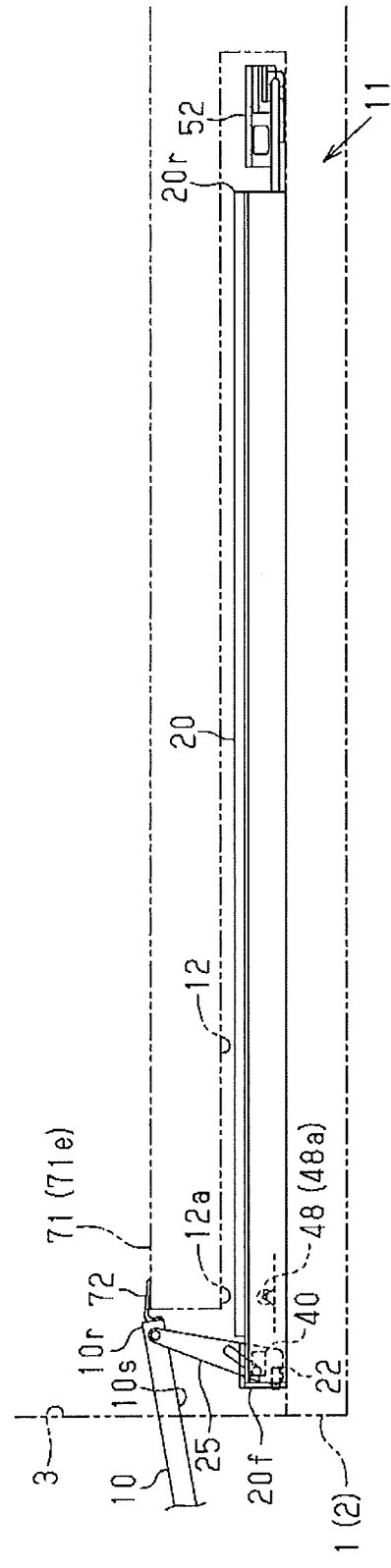

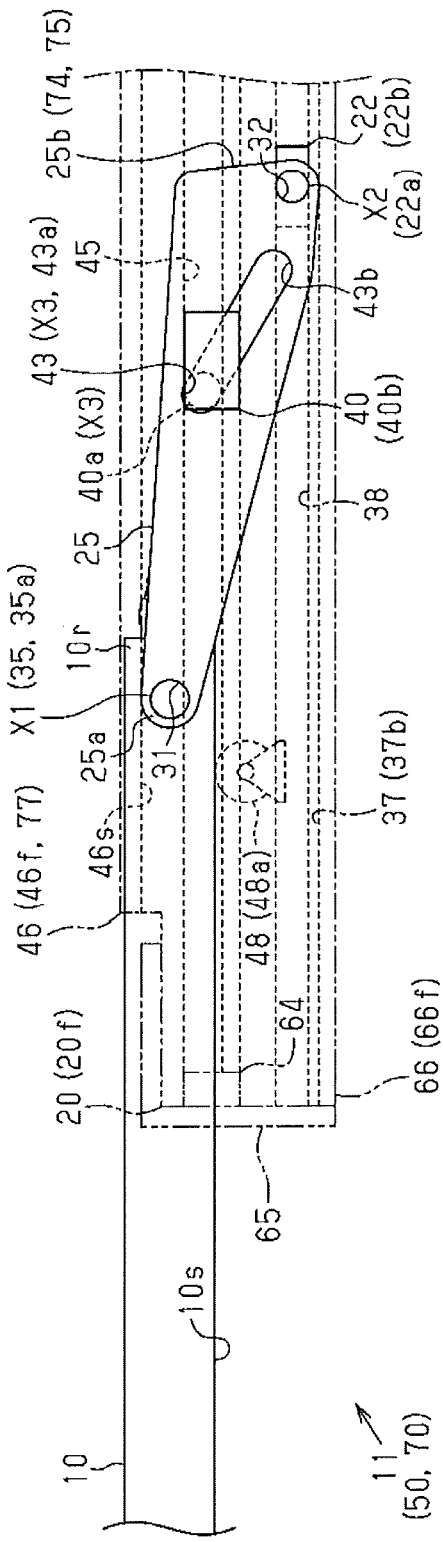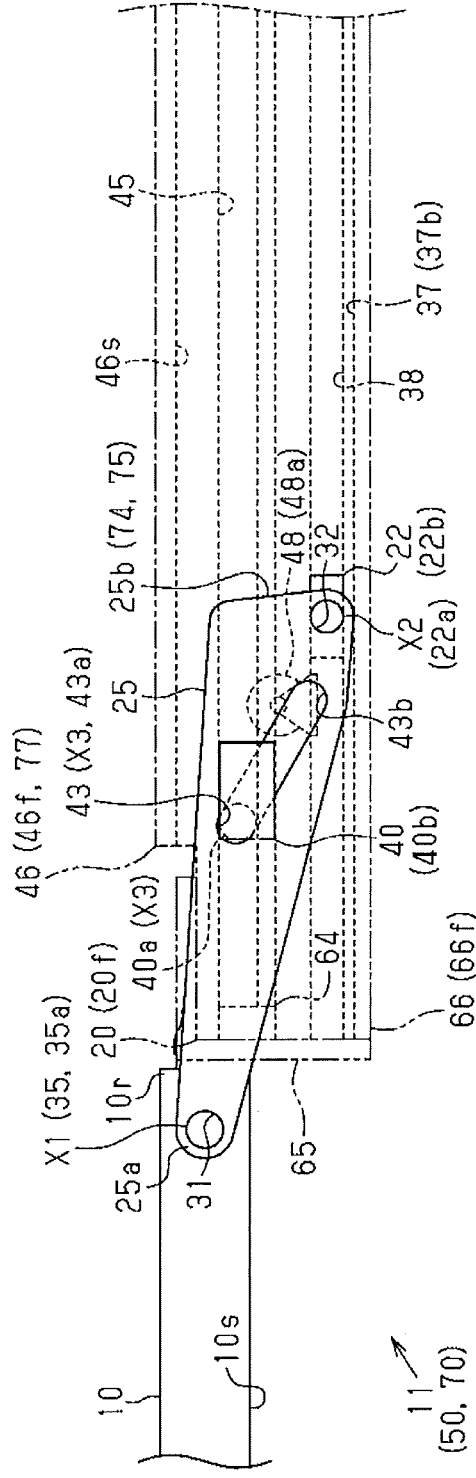

LIFTED STATE

BEFORE LIFTING

DURING LIFTING

STORED

LIFTED STATE

BEFORE LIFTING

DURING LIFTING

LIFTED STATE

DURING MOVEMENT AND STORING OPERATION

DEPLOYED STATE: LIFT-UP COMPLETED

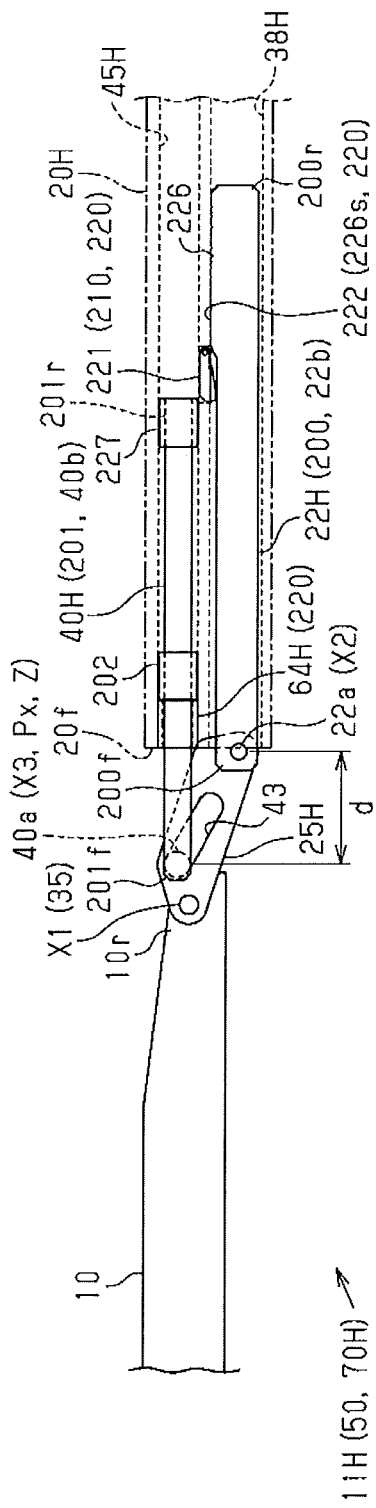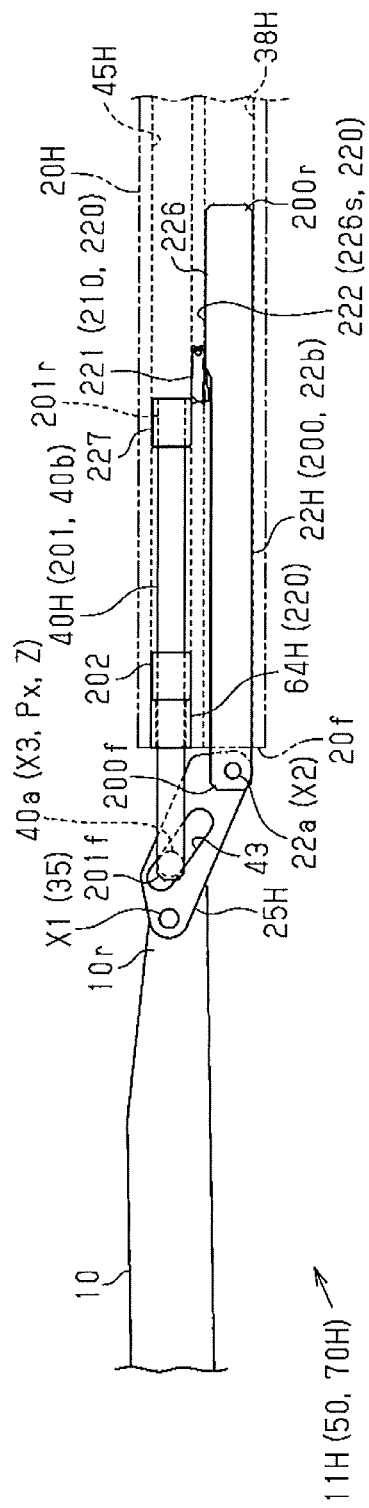

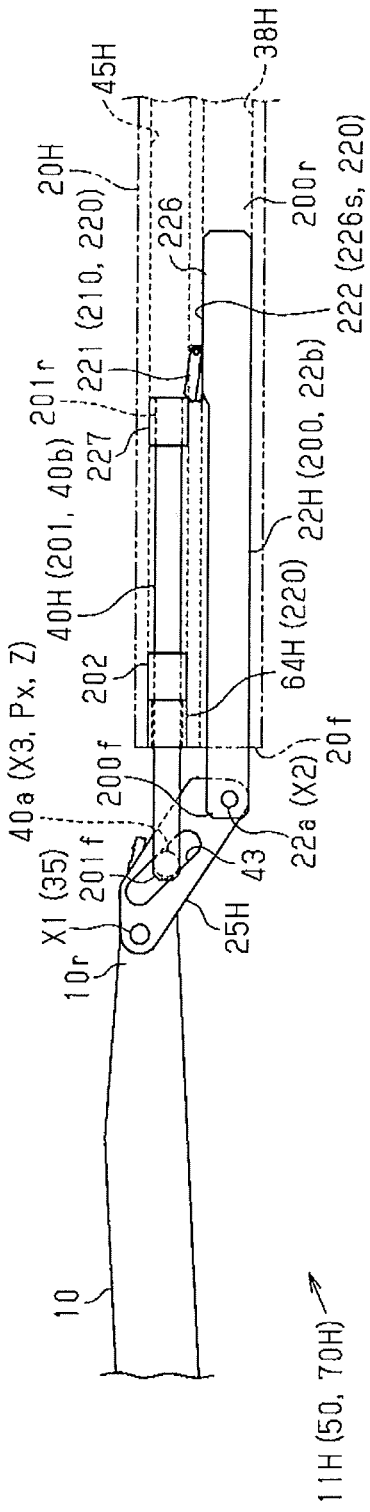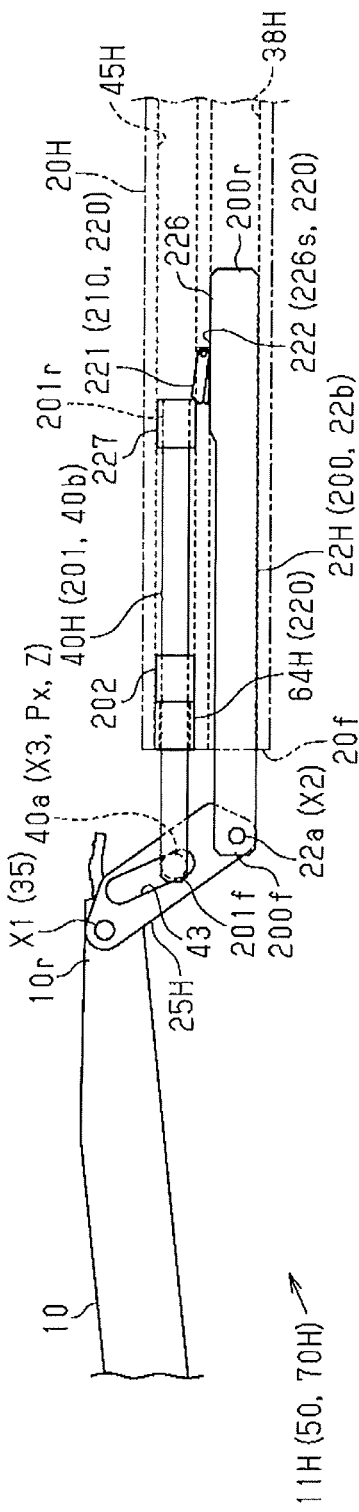

VEHICULAR SLOPE APPARATUS

CROSS REFERENCE TO RELATED APPLICATIONS

This application is based on and claims priority under 35 U.S.C. § 119 to Japanese Patent Applications 2018-196141, 2019-60670 and 2019-166372, filed on Oct. 17, 2018, Mar. 27, 2019 and Sep. 12, 2019, respectively, the entire contents of which are incorporated herein by reference.

TECHNICAL FIELD

This disclosure relates to a vehicular slope apparatus.

BACKGROUND DISCUSSION

In the related art, there is a slope apparatus for a vehicle that deploys a slope plate stored below a vehicle floor to a lower end of a door opening portion. For example, the slope apparatus disclosed in JP 2003-112578 (Reference 1) includes a moving body that moves in a depth direction, that is, a deploying and storing direction within a storing box in which the slope plate is stored. Moreover, the moving body is connected to the slope plate via a link member. Furthermore, the link member includes an engagement portion (guide body) that engages with a guide portion formed on a side wall portion of the storing box at a position on a rear side (storing direction) from a connection point with respect to the moving body. Then, while changing the inclination angle of the slope plate based on the slope shape set in the guide portion, in conjunction with the operation of the moving body, the slope plate can be deployed from the storing box to the outside of the vehicle and stored in the storing box again.

That is, by setting a distance between a first connection point for the slope plate and a second connection point for the moving body to be long, even if the vertical displacement of the engagement portion based on the slope shape provided in the guide portion is small, the slope plate connected to the moving body via the link member can be largely tilted. Thus, the above-described slope apparatus of the related art is configured to improve the mountability with respect to the vehicle while suppressing the vertical storing space.

However, in the configuration of the above-described related art, it is difficult to bring the rear end portion of the slope plate deployed to the lower end of the door opening portion close to the vehicle floor. Then, for example, since there is a problem in that an additional extension member that is stretched over between the rear end portion of the slope plate and the vehicle floor, such as a lid member of the storing box, is required, there is still room for improvement in this respect.

Thus, a need exists for a vehicular slope apparatus which is not susceptible to the drawback mentioned above.

SUMMARY

A vehicular slope apparatus according to an aspect of this disclosure includes a slope plate that deploys to a lower end of a door opening portion, a guide rail that extends in a deploying and storing direction of the slope plate, a drive shoe that moves in an extending direction of the guide rail, a link member that has a first connection point rotatably connected to a rear end portion of the slope plate and a second connection point rotatably connected to the drive shoe, a posture holding mechanism configured such that the slope plate moves, based on an engaged state of the link member with respect to the guide rail, in the extending direction of the guide rail in conjunction with the drive shoe in a state of holding a posture of the link member, and a lift mechanism configured to form a rotation fulcrum of the link member between the first connection point and the second connection point and to rotate the link member by changing an interval between the rotation fulcrum and the second connection point in the extending direction of the guide rail based on the movement of the drive shoe from a rear end portion side toward a front end portion of the guide rail to thereby lift the rear end portion of the slope plate in a state in which the slope plate is deployed to the door opening portion as the rear end portion of the slope plate is moved to a front end portion of the guide rail.

BRIEF DESCRIPTION OF THE DRAWINGS

The foregoing and additional features and characteristics of this disclosure will become more apparent from the following detailed description considered with the reference to the accompanying drawings, wherein:

FIG. 3A is a side view of the slope apparatus provided below the door opening portion in a stored state, and FIG. 3B is a side view of the slope apparatus provided below the door opening portion in a deployed state;

FIG. 7A is a side view of a slope apparatus according to a first embodiment during a deploying and storing operation, and FIG. 7B is a side view of the slope apparatus according to the first embodiment during a deployed state;

FIGS. 38A and 38B are side views of the slope apparatus according to the fifth embodiment; and FIGS. 39A and 39B are side views of the slope apparatus according to the fifth embodiment.

DETAILED DESCRIPTION

First Embodiment

Figure 1:
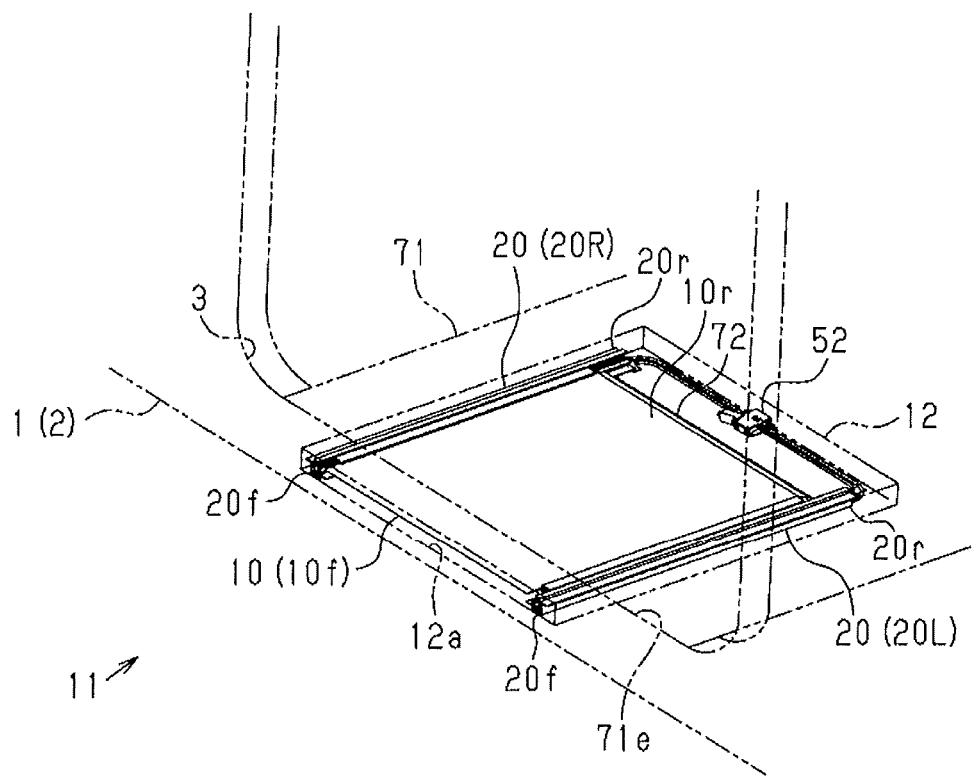
FIG. 1 is a perspective view of a slope apparatus provided below a door opening portion in a stored state.

Hereinafter, a first embodiment that embodies a slope apparatus for a vehicle will be described with reference to the drawings.

As illustrated in FIGS. 1, 2, 3A, and 3B, a vehicle 1 of the present embodiment is provided with a slope apparatus 11 that deploys a slope plate 10 to a lower end of a door opening portion 3 provided in a vehicle body 2. In the vehicle 1 of the present embodiment, the slope apparatus 11 is installed in a storing box 12 provided below the door opening portion 3. Specifically, the storing box 12 has an opening portion 12a in the same direction as the door opening portion 3 (left side in FIGS. 3A and 3B). Then, the slope apparatus 11 of the present embodiment is configured to deploy the slope plate 10 stored in the storing box 12 to the outside of the vehicle and to store the deployed slope plate 10 in the storing box 12 again via the opening portion 12a.

As the door opening portion 3 where the slope apparatus 11 is installed, for example, a rear opening portion (back door) of the vehicle 1 or a side opening portion (side door) opened and closed by a slide door or a so-called glide door is assumed. By using the slope plate 10 deployed to such a door opening portion 3, for example, a wheelchair, a bicycle or the like can be easily loaded into a vehicle interior.

Figure 2:
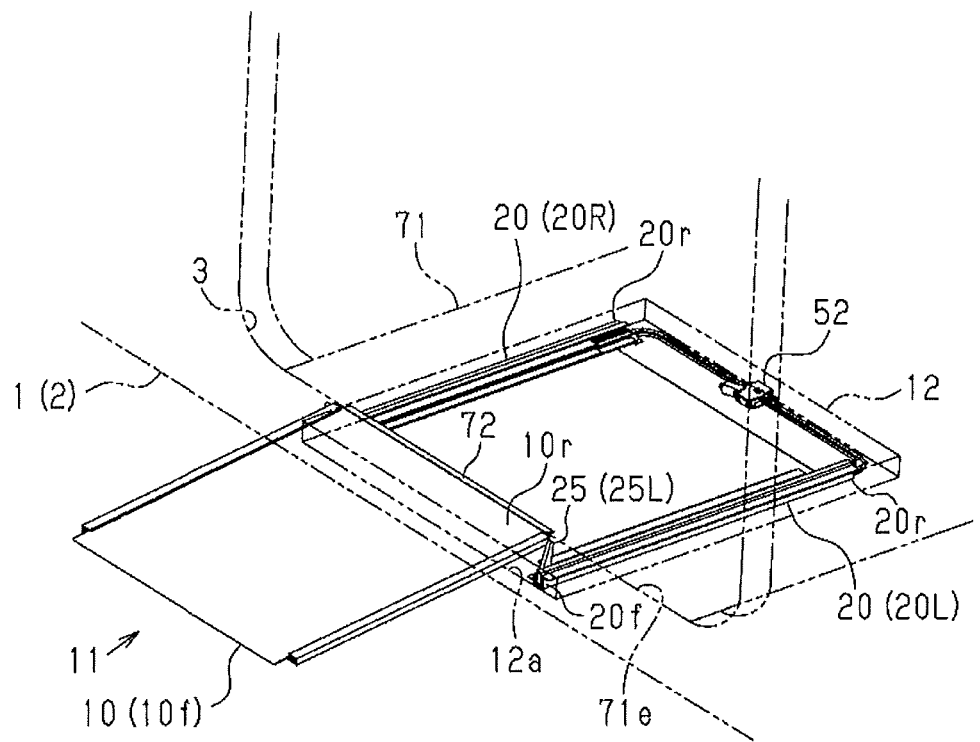
FIG. 2 is a perspective view of the slope apparatus provided below the door opening portion in a deployed state.

In detail, as illustrated in FIGS. 3A to 5, the slope apparatus 11 of the present embodiment includes a pair of guide rails 20 and 20 that extends in a deploying and storing direction of the slope plate 10 deployed to the lower end of the door opening portion 3 while being pushed out from the storing box 12 to the outside of the vehicle, that is, the depth direction of the storing box 12 (left and right direction in FIGS. 3A and 3B) (see FIGS. 1 and 2). Moreover, the slope apparatus 11 includes a pair of drive shoes 22 and 22 slidably provided along the extending direction of the guide rails 20 to be engaged in a state of being engaged with each of these guide rails 20. The slope apparatus 11 of the present embodiment includes a pair of link members 25 and 25 that is rotatably connected to the rear end portion 10r of the slope plate 10 which is pushed out to the outside of the vehicle from the storing box 12 with the front end portion 10f at the top and that is rotatably connected to the drive shoes 22.

Figure 6:
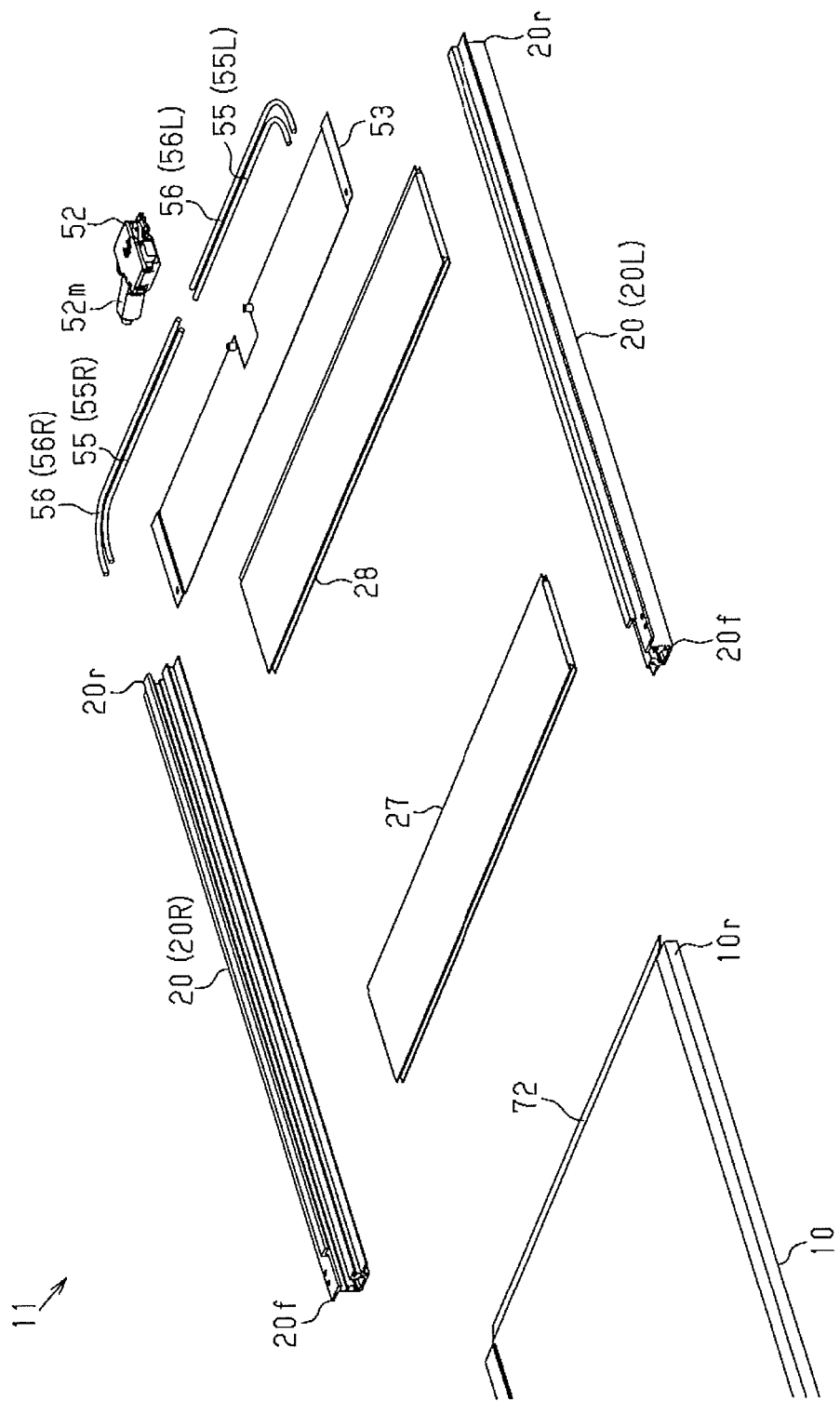
FIG. 6 is an exploded perspective view of the slope apparatus.

As illustrated in FIGS. 1, 2, and 6, the guide rails 20 of the present embodiment are arranged substantially in parallel so as to sandwich both sides in the width direction of the slope plate 10 stored in the storing box 12 by being pulled back from the rear end portion 10r side. In the slope apparatus 11 of the present embodiment, each of these guide rails 20 is connected to each other via fixing members 27 and 28. Thus, the slope apparatus 11 of the present embodiment is configured to keep the separation distance between the guide rails 20 and 20 constant.

As illustrated in FIGS. 4, 5, 7A, and 7B, each link member 25 of the present embodiment has a long substantially flat outer shape. Each of these link members 25 includes through holes 31 and 32 that penetrate each of these link members 25 in the thickness direction (left and right direction in FIG. 5, direction perpendicular to the paper surface in FIGS. 7A and 7B) at the both end portions in the longitudinal direction. Each drive shoe 22 of the present embodiment includes a shaft-like portion 22a that is inserted through the through hole 32 provided in a second end portion 25b of the link member 25.

The slope apparatus 11 of the present embodiment includes a pair of connecting members 35 and 35 each having a shaft-like portion 35a inserted through the through hole 31 provided in a first end portion 25a of the link member 25. Each of these connecting members 35 and 35 is provided with a fixing portion 35b for the rear end portion 10r of the slope plate 10.

That is, in the slope apparatus 11 of the present embodiment, a first connection point X1 of each link member 25 with respect to the slope plate 10 is formed using the shaft-like portion 35a of each of these connecting members 35 as a support shaft. A second connection point X2 of each link member 25 with respect to each drive shoe 22 is formed using the shaft-like portion 22a of each drive shoe 22 as a support shaft.

Each guide rail 20 of the present embodiment includes a groove-shaped link guide portion 37 which disposes the link member 25 inside thereof in a state where the first end portion 25a protrudes from the upper end portion thereof. Furthermore, each guide rail 20 includes groove-shaped drive guide portions 38 and 38 having opening portions in side wall surfaces 37s of the link guide portion 37 and extending in the extending direction (left and right direction in FIGS. 7A and 7B) of the guide rail 20 with the link guide portion 37 thereof. Each drive shoe 22 of the present embodiment includes an engagement portion 22b for the drive guide portion 38 provided on each corresponding guide rail 20.

In the slope apparatus 11 of the present embodiment, the engagement portion 22b of each of these drive shoes 22 engages with the drive guide portion 38 located on the right side (right side in FIG. 5) in the deploying direction of the slope plate 10 between the above-described drive guide portions 38 and 38 provided on each guide rail 20. Each drive shoe 22 of the present embodiment is configured to move along the extending direction of each guide rail 20 in a state where the movement in the vertical direction is restricted by being guided by each of these drive guide portions 38.

The slope apparatus 11 of the present embodiment includes a pair of driven shoes 40 and 40 that is rotatably connected to the link members 25 at positions between the first connection point X1 and the second connection point X2, respectively.

Specifically, each link member 25 of the present embodiment includes a long hole 43 extending in the longitudinal direction at a position between the first end portion 25a and the second end portion 25b. Each driven shoe 40 of the present embodiment includes a shaft-like portion 40a inserted through the long hole 43 and an engagement portion 40b provided at a shaft end portion of the shaft-like portion 40a.

Each guide rail 20 of the present embodiment includes a groove-shaped driven guide portion 45 having an opening portion in the side wall surface 37s (left side wall surface in FIG. 5) of the link guide portion 37 and extending in the extending direction (left and right direction in FIGS. 7A and 7B), like the drive guide portion 38. The driven guide portion 45 of the present embodiment is provided above each drive guide portion 38. Furthermore, each driven shoe 40 of the present embodiment is configured such that the engagement portion 40b is engaged with the driven guide portion 45, respectively. Then, the slope apparatus 11 of the present embodiment is configured such that, integrated with each drive shoe together with each drive shoe 22 and each link member 25, each driven shoe 40 moves in the extending direction of each guide rail 20 in a state where the movement in the vertical direction is restricted in conjunction with each drive shoe 22.

In more detail, as illustrated in FIG. 7A, based on the engaged state of each link member 25 with respect to each guide rail 20 via each drive shoe 22 and each driven shoe 40 as described above, the slope apparatus 11 of the present embodiment holds the posture of each of these link members 25. Specifically, each link member 25 of the present embodiment is held in a posture (forward leaning posture) in which the first connection point X1 with respect to the slope plate 10 is disposed above the second connection point X2 with respect to the drive shoe 22 and the first connection point X1 is disposed on a front end portion 20f side of the guide rail 20 relative to the second connection point X2, that is, the deploying direction of the slope plate 10 (left side in FIG. 7).

As illustrated in FIGS. 4, 5, 7A, and 7B, each guide rail 20 of the present embodiment includes a top plate portion 46 that extends in the extending direction above the link guide portion 37 that disposes each link member 25 held in a forward leaning posture inside thereof. The slope apparatus 11 of the present embodiment is configured such that the first end portion 25a of each link member 25 provided with the first connection point X1 with respect to the slope plate 10 comes into slide contact with a lower surface 46s of the top plate portion 46 provided in each of these guide rails 20.

That is, as illustrated in FIGS. 7A and 7B, as each drive shoe 22 moves in the extending direction of the guide rail 20, the slope apparatus 11 of the present embodiment deploys the slope plate 10 to the outside of vehicle by being pushed out from the storing box 12 and stores it in the storing box 12 by being pulled back via link member 25 connected to each of these drive shoes 22. Moreover, each link member 25 of the present embodiment is in the forward leaning posture as described above as the shaft-like portion 40a of each driven shoe 40 inserted through the long hole 43 is located at an end portion 43a on the first end portion 25a side of the long hole 43. At this time, in the slope apparatus 11 of the present embodiment, the rotation of each link member 25 based on the change in the position of the shaft-like portion 40a inserted through the long hole 43 is restricted as the first end portion 25a of each of these link members 25 comes into slide contact (engagement) with (the lower surface 46s of) the top plate portion 46 provided on each guide rail 20. Then, in the slope apparatus 11 of the present embodiment, a posture holding mechanism 50 is formed which moves the slope plate 10 in the extending direction of each guide rail 20 in conjunction with each drive shoe 22 in a state where the forward leaning posture of each of these link members 25 is held based on the engaged state of each link member 25 with respect to each guide rail 20.

Figure 5:
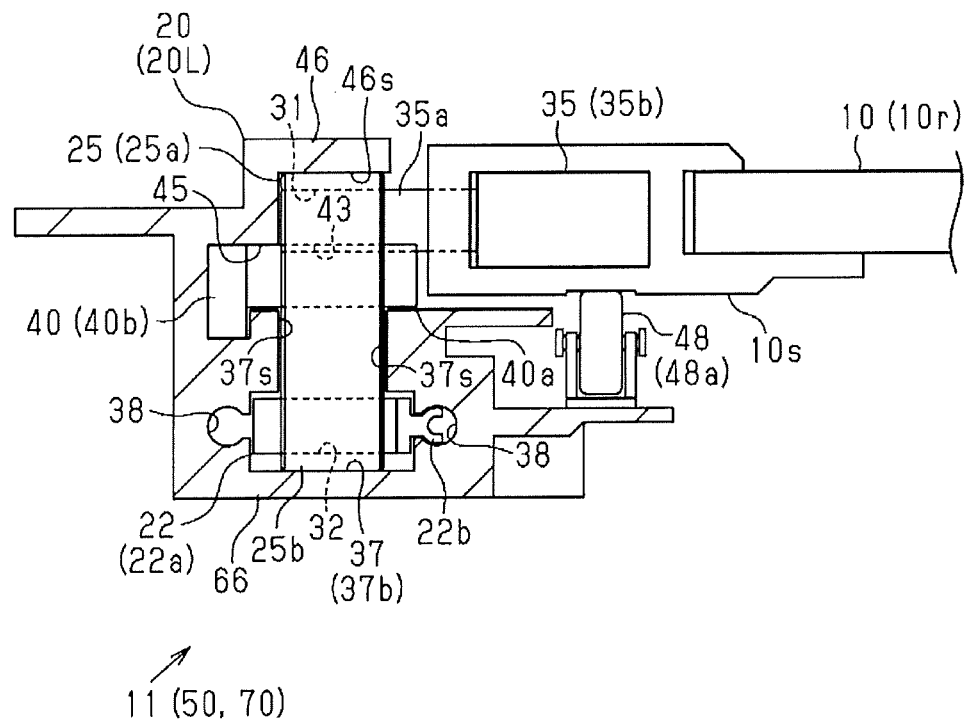
FIG. 5 is a cross-sectional view of the slope apparatus taken along line V-V in FIG. 3A.

As illustrated in FIGS. 5, 7A, and 7B, the slope apparatus 11 of the present embodiment includes a slope support portion 48 having a roller 48a as a rotating member that abuts on a lower surface 10s of the slope plate 10 in a state where the first end portion 25a of each link member 25 is engaged with the top plate portion 46 of each guide rail 20. Thus, in the slope apparatus 11 of the present embodiment, the slope plate 10 moves in the extending direction of each guide rail 20 in conjunction with each drive shoe 22 in a substantially horizontal stable posture.

As illustrated in FIG. 7B, in the slope apparatus 11 of the present embodiment, as each drive shoe 22 moves from a rear end portion 20r side to the front end portion 20f side of each guide rail 20 (from right to left in FIG. 7), the lower surface 10s of the slope plate 10 is not abutted on the roller 48a on the front end portion 20f side of each guide rail 20. Thus, the slope apparatus 11 of the present embodiment is configured to deploy the slope plate 10 to the lower end of the door opening portion 3 in a state in which the slope plate 10 is allowed to tilt with the first connection point X1 provided in the first end portion 25a of each link member 25 as a fulcrum.

Figure 8:
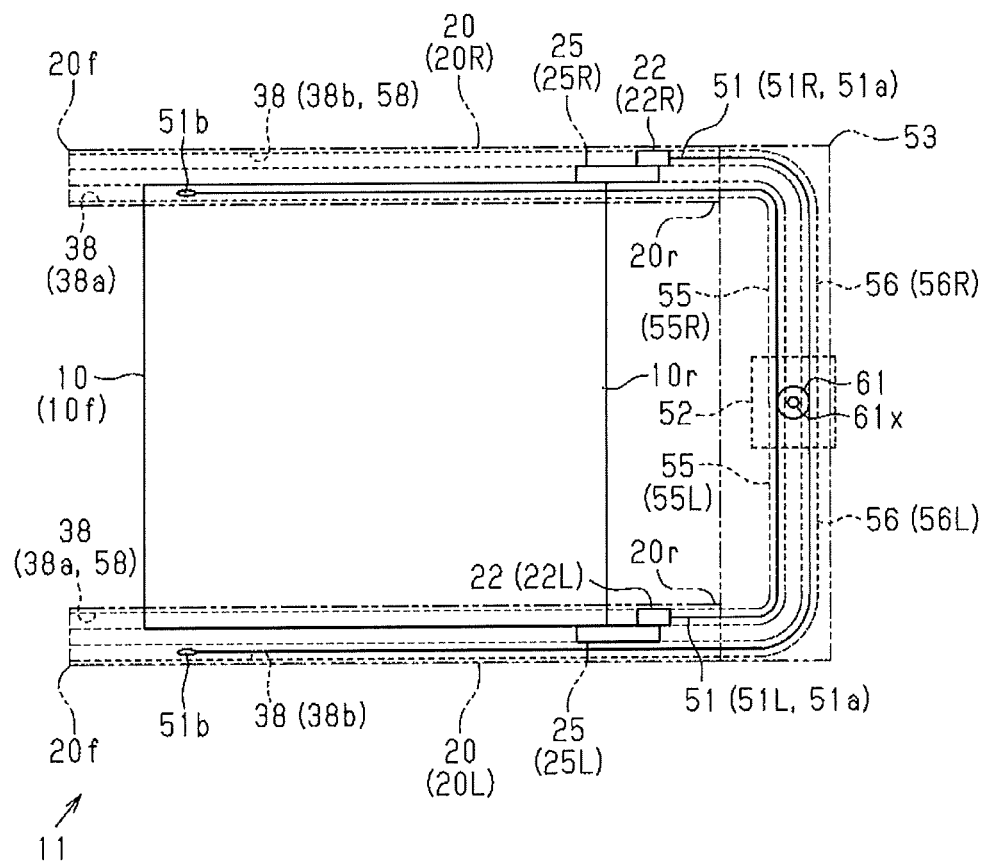
FIG. 8 is a plan view of the slope apparatus.

In more detail, as illustrated in FIG. 8, the slope apparatus 11 of the present embodiment includes a pair of drive cables 51 (51R and 51L) that is routed along the extending direction of each guide rail 20 (20R and 20L). Moreover, in the slope apparatus 11 of the present embodiment, one end side (connection end 51a) of each of these drive cables 51 is engaged with each drive shoe 22 (22R and 22L) that engages with the drive guide portion 38 provided at each guide rail 20 (20R and 20L). The slope apparatus 11 of the present embodiment includes an actuator 52 that causes each of these drive cables 51 to slide along the extending direction of each guide rail 20 using a motor 52m as a drive source.

That is, the slope apparatus 11 of the present embodiment moves each drive shoe 22 in the extending direction of each guide rail 20 based on the drive force of the actuator 52 transmitted via each drive cable 51. Thus, the slope plate 10 connected to each drive shoe 22 is moved in the deploying and storing direction via each link member 25 (25R and 25L).

As illustrated in FIGS. 6 and 8, the slope apparatus 11 of the present embodiment includes a bracket 53 having a substantially flat plate shape extending in the width direction of the slope plate 10 (vertical direction in FIG. 8) and connected to the rear end portion 20r of each guide rail 20 (20R and 20L). Moreover, the actuator 52 of the present embodiment is fixed to a substantially central portion of the bracket 53 in the longitudinal direction. Furthermore, the slope apparatus 11 of the present embodiment includes casing pipes 55 (55R and 55L) that connect between the actuator 52 and the inner drive guide portion 38a of each guide rail 20 and casing pipes 56 (56R and 56L) that connect between the actuator 52 and the outer drive guide portion 38b of each guide rail 20. Each drive cable 51 of the present embodiment is configured to be driven by the actuator 52 using each of these casing pipes 55 and 56 and each drive guide portions 38 (38a and 38b) as sliding paths 58.

That is, in the slope apparatus 11 of the present embodiment, one drive cable 51L is routed in the inner drive guide portion 38a of each guide rail 20 (20R and 20L) via casing pipes 55R and 55L. The other drive cable 51R is routed in the outer drive guide portion 38b of each guide rail 20 (20R and 20L) via the casing pipes 56R and 56L. Then, the slope apparatus 11 of the present embodiment is configured such that the connection end 51a of one drive cable 51R is connected to the drive shoe 22R that engages with the right guide rail 20R and the connection end 51a of the other drive cable 51L is connected to the drive shoe 22L that engages with the left guide rail 20L.

In the slope apparatus 11 of the present embodiment, the connection ends 51a and 51a of each drive cable 51 (51R and 51L) are connected to the engagement portion 22b of each drive shoes 22 (22R and 22L) in the inserted drive guide portion 38. Free ends 51b and 51b of each of these drive cables 51 (51R and 51L) are configured to be routed in the drive guide portion 38 of the guide rails 20 and 20 opposite to left and right with the guide rails 20 and 20 where the connection ends 51a and 51a are routed.

Figure 9:
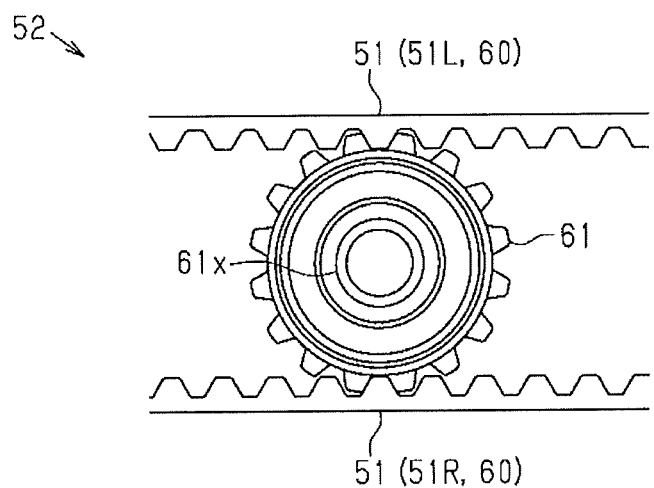
FIG. 9 is a schematic configuration view of a drive cable and an actuator.

As illustrated in FIG. 9, each drive cable 51 (51R and 51L) of the present embodiment has a configuration as a flat-tooth rack belt 60. The actuator 52 of the present embodiment includes a pinion gear 61 that rotates in a state of meshing with both of these drive cables 51 (51R and 51L).

That is, the actuator 52 of the present embodiment is configured such that the drive cables 51 (51R and 51L) mesh with the pinion gear 61 at two positions (in the vertical direction in FIG. 9) that interpose a rotary shaft 61x of the pinion gear 61 therebetween. Thus, in the slope apparatus 11 of the present embodiment, the drive shoes 22 (22R and 22L) are configured to synchronize with each other and to move toward the front end portion 20f side or the rear end portion 20r side of each guide rail 20 (20R and 20L) based on the sliding of each drive cable 51 (51R and 51L) driven by the actuator 52.

Lift Mechanism

Next, the configuration of a lift mechanism mounted on the slope apparatus 11 of the present embodiment will be described.

Figure 10:
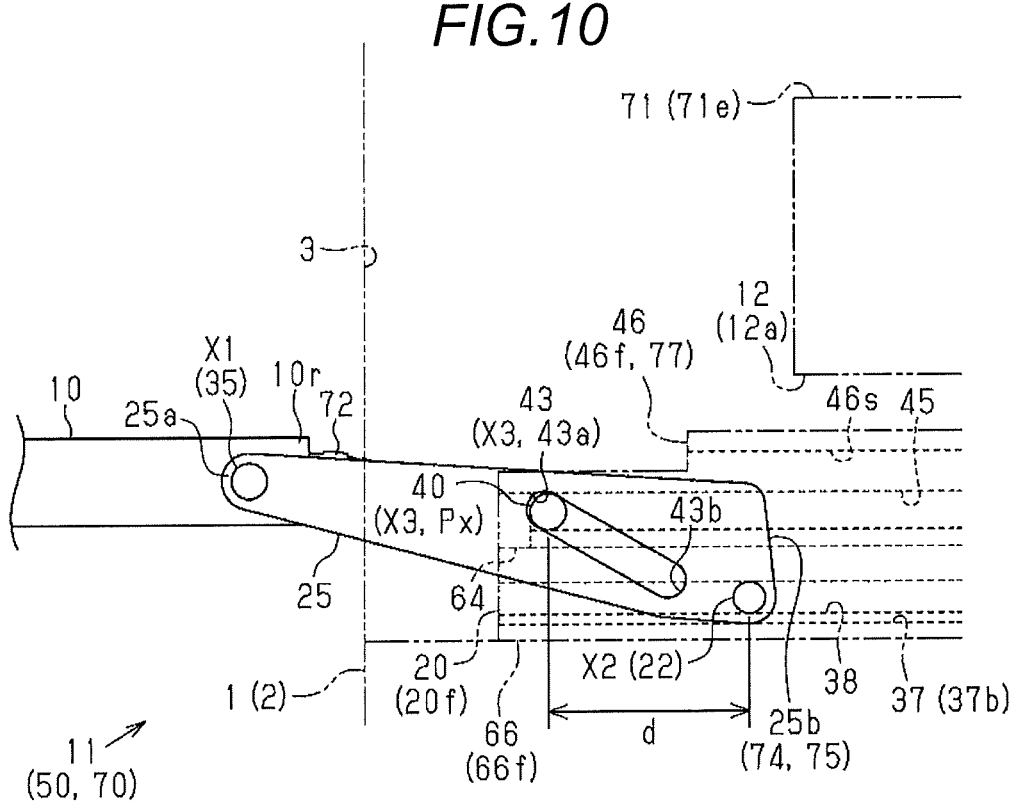
FIG. 10 is a side view of formation of a rotation fulcrum in the slope apparatus according to the first embodiment.

As illustrated in FIG. 10, each guide rail 20 of the present embodiment is configured such that the first end portion 25a of each link member 25 is detached from the top plate portion 46 of each guide rail 20 by moving the rear end portion 10r of the slope plate 10 to the front end portion 20f of each of these guide rails 20 in a state where the slope plate 10 is deployed to the door opening portion 3. Specifically, in each guide rail 20 of the present embodiment, a front end 46f of the top plate portion 46 is set on the rear end portion 20r side of the guide rail (right side in FIG. 10) from a front end 66f of a bottom plate portion 66 which forms a bottom surface 37b of the link guide portion 37. Thus, each guide rail 20 of the present embodiment is configured such that the first end portion 25a of each link member 25 is detached from the top plate portion 46 of each guide rail 20 in a state where each of these drive shoes 22 is engaged with the drive guide portion 38 when each drive shoe 22 is moved to the front end portion 20f.

Figure 11:
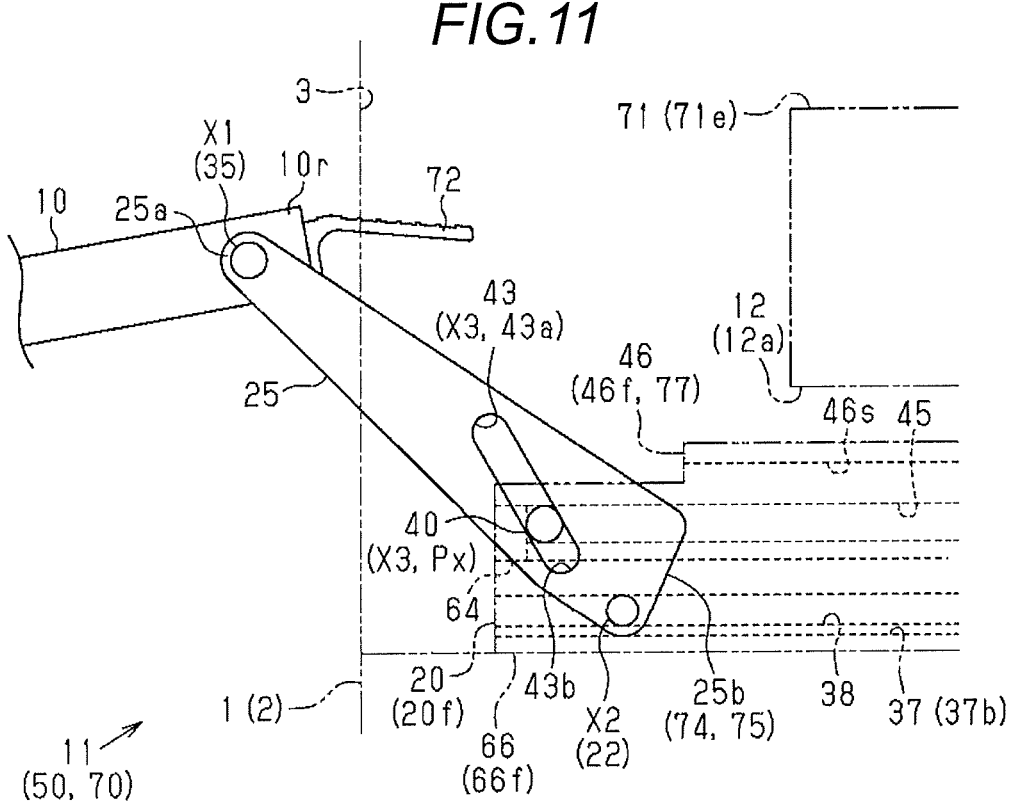
FIG. 11 is a side view of rotation of a link member in the slope apparatus according to the first embodiment.
Figure 12:
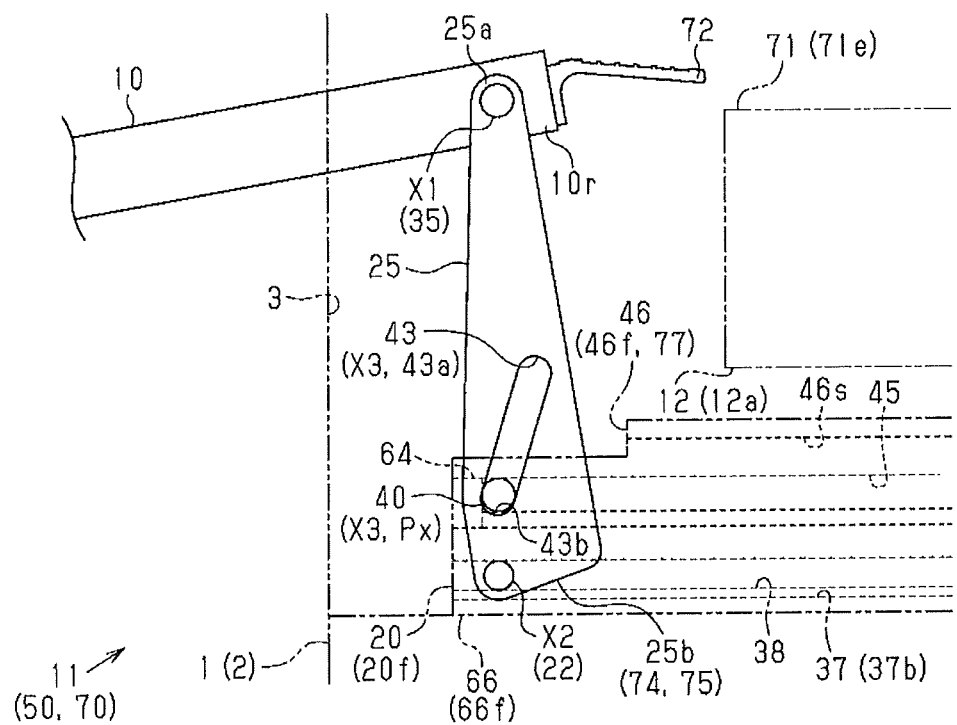
FIG. 12 is a side view of the slope apparatus according to the first embodiment at an uppermost position.

As illustrated in FIGS. 10 to 12, the slope apparatus 11 of the present embodiment includes a stopper portion 64 that restricts the movement of each driven shoe 40 toward the front end portion 20f side of each guide rail 20 by abutting on each driven shoe 40 in a state where the slope plate 10 is deployed to the door opening portion 3 as described above. Thus, in the slope apparatus 11 of the present embodiment, based on the engaged state of each link member 25 with respect to each guide rail 20, a lift mechanism 70 that lifts the rear end portion 10r of the slope plate 10 upward in conjunction with each drive shoe 22 that moves from the rear end portion 20r side toward the front end portion 20f side of the guide rail is formed.

Figure 4:
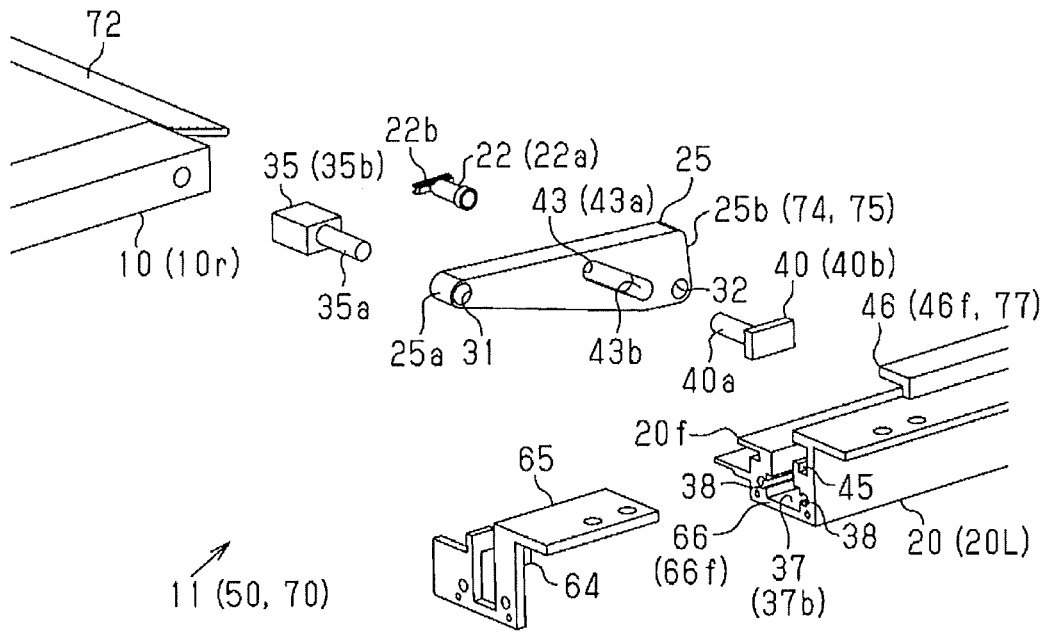
FIG. 4 is an exploded perspective view of the slope apparatus.

In more detail, as illustrated in FIGS. 4, 7A, and 7B, the slope apparatus 11 of the present embodiment includes a pair of end blocks 65 and 65 that is fixed to the front end portion 20f of each guide rail 20. The stopper portion 64 of the present embodiment is provided integrally with each of these end blocks 65.

As illustrated in FIGS. 10 to 12, in the slope apparatus 11 of the present embodiment, each link member 25 is allowed to rotate about the shaft-like portion 40a of the driven shoe 40 inserted through the long hole 43 as a fulcrum (rotation fulcrum Px) by detaching the first end portion 25a from the top plate portion 46 of each guide rail 20 as described above. Furthermore, at this time, apparently, the shaft-like portion 40a moves in the long hole 43, so that the separation distance between a third connection point X3 for each driven shoe 40 formed by the long hole 43 and the shaft-like portion 40a and the second connection point X2 for each drive shoe 22 changes. Then, in the slope apparatus 11 of the present embodiment, each drive shoe 22 can continue to move from the rear end portion 20r side toward the front end portion 20f of each guide rail 20 (right to left in FIGS. 10 to 12) even after each driven shoe 40 abuts on each stopper portion 64 as described above.

That is, when each drive shoe 22 moves along the extending direction of each guide rail 20 in a state where the movement of each driven shoe 40 is restricted, the interval between the third connection point X3 and the second connection point X2 in the extending direction of the each guide rail 20, that is, the interval (distance) d between the rotation fulcrum Px of each link member 25 and the second connection point X2 of each drive shoe 22 changes. Accordingly, the slope apparatus 11 of the present embodiment is configured such that the rear end portion 10r of the slope plate 10 connected to each of these link members 25 is lifted upward by the rotation of each link member 25 engaged with each guide rail 20 via each drive shoe 22 and each driven shoe 40.

Specifically, each drive shoe 22 is moved to the front end portion 20f side of each guide rail 20 in a state where each driven shoe 40 abuts on each stopper portion 64, so that the position of the shaft-like portion 40a of the driven shoe 40 inserted through the long hole 43 of each link member 25 is apparently moved from the end portion 43a on the first end portion 25a side to an end portion 43b on the second end portion 25b side. Thus, the slope apparatus 11 of the present embodiment is configured such that each link member 25 rotates in a direction in which the first end portion 25a provided with the first connection point X1 with respect to the rear end portion 10r of the slope plate is lifted (clockwise direction in FIGS. 10 to 12).

Figure 13:
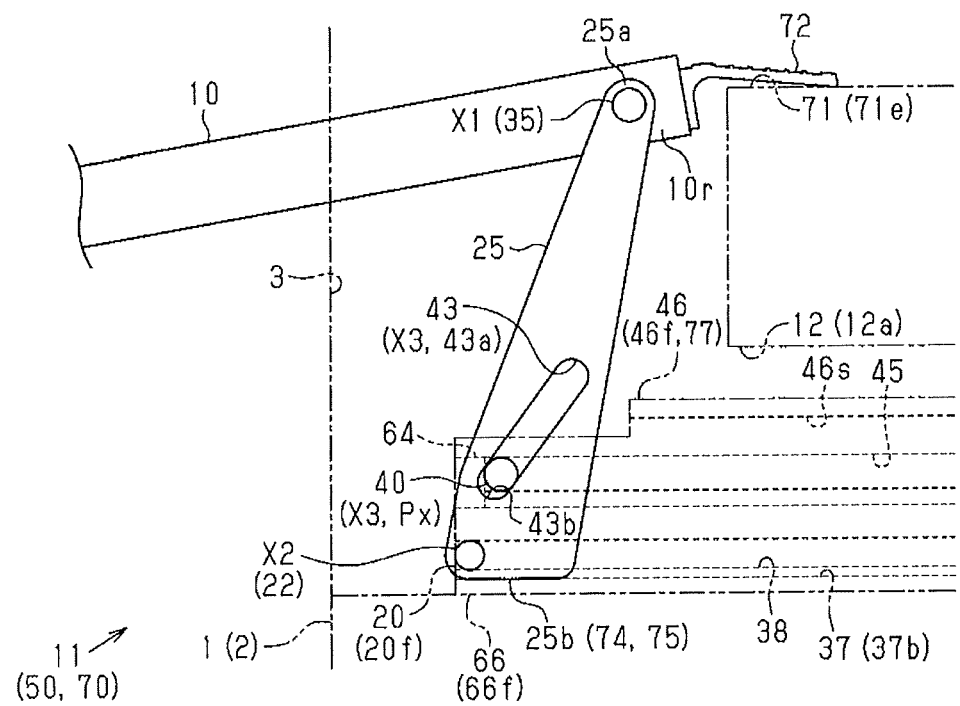
FIG. 13 is a side view of the slope apparatus according to the first embodiment at a rear movement position.

As illustrated in FIG. 13, in the slope apparatus 11 of the present embodiment, each drive shoe 22 moves to the front end portion 20f side of each guide rail 20 by overtaking each driven shoe 40 abutting on each stopper portion 64. Furthermore, in the slope apparatus 11 of the present embodiment, the second connection point X2 of each link member 25 moves to the front end portion 20f side of each guide rail 20 beyond the third connection point X3 constituting the rotation fulcrum Px of each of these link members 25. Then, the lift mechanism 70 of the present embodiment is configured to move the first connection point X1 with respect to the rear end portion 10r of the slope plate 10 to the rear end portion 20r side of the guide rail 20 with respect to the rotation fulcrum Px by further rotating each link member 25.

Specifically, as illustrated in FIG. 12, in the slope apparatus 11 of the present embodiment, the rear end portion 10r of the slope plate 10 connected to the first end portion 25a is lifted to the uppermost position at the position where the movement position of each drive shoe 22 along the extending direction of each guide rail 20 is equal to the third connection point X3 constituting the rotation fulcrum Px of each link member 25. Then, as illustrated in FIG. 13, by further rotating each link member 25 from this state, the rear end portion 10r of the slope plate 10 is configured to move toward the rear end portion 20r side of each guide rail 20 while gradually lowering the position lifted by each link member 25.

In more detail, in the slope apparatus 11 of the present embodiment, the rear end portion 10r of the slope plate 10 is provided with an engagement portion 72 that engages with a vehicle floor 71 facing the door opening portion 3 in a state of being lifted upward by the rotation of each link member 25.

Specifically, the slope apparatus 11 of the present embodiment is configured such that the engagement portion 72 provided at the rear end portion 10r is engaged with an edge portion 71e of the vehicle floor 71 from above based on the movement of the slope plate 10 toward the rear end portion 20r side of each guide rail 20 while the rear end portion 10r connected to each link member 25 gradually descends as described above. In the vehicle 1 of the present embodiment, the load of the slope plate 10 is supported by the vehicle floor 71.

In the second end portion 25b of each link member 25 provided with the second connection point X2 with respect to each drive shoe 22, a rotation restricting portion 74 is provided which restricts the rotation of each link member 25 by abutting on the bottom plate portion 66 of the guide rail 20 from above in a state where each link member 25 is rotated in the direction of lifting the rear end portion 10r of the slope plate 10.

Specifically, each link member 25 of the present embodiment has a flat surface 75 at the second end portion 25b. Furthermore, when the engagement portion 72 provided at the rear end portion 10r of the slope plate 10 is in the rotational position to be engaged with the edge portion 71e of the vehicle floor 71 facing the door opening portion 3 as described above, each link member 25 is configured such that the flat surface 75 abuts on the bottom surface 37b of the link guide portion 37 that disposes each of these link member 25 inside from above. The slope apparatus 11 of the present embodiment is configured such that the rotation (rotation in the clockwise direction in FIGS. 12 and 13) of each link member 25 is restricted using the flat surface 75 as the rotation restricting portion 74.

Figure 14A:
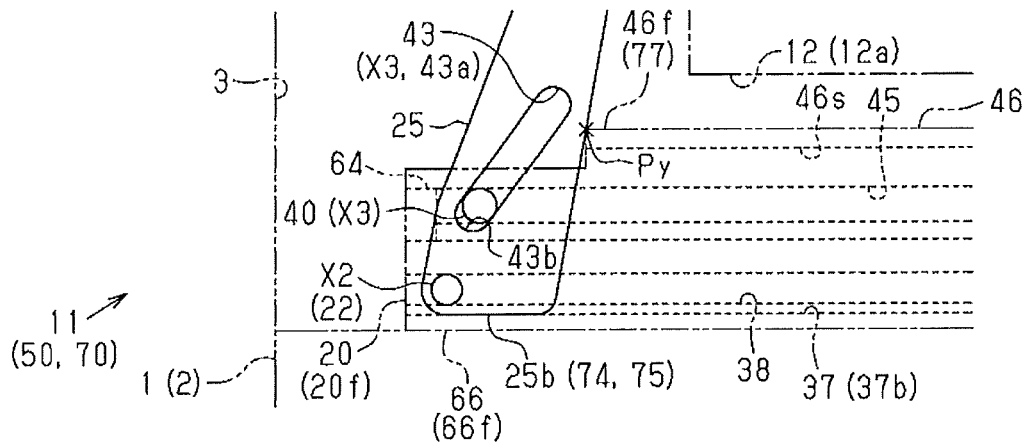
FIG. 14A is a side view of formation of a second rotation fulcrum in the slope apparatus according to the first embodiment.
Figure 14B:
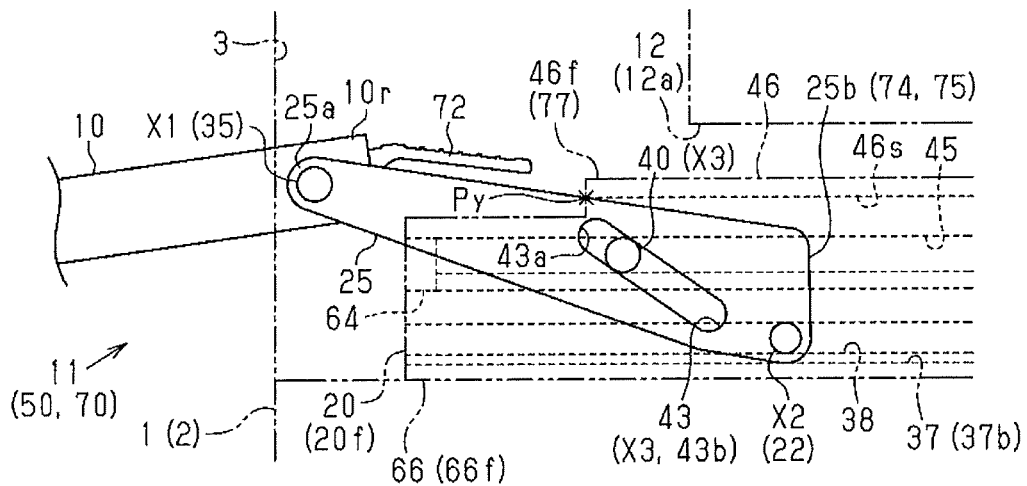
FIGS. 14B and 14C are side views of rotation of the link member in the slope apparatus according to the first embodiment.
Figure 14C:
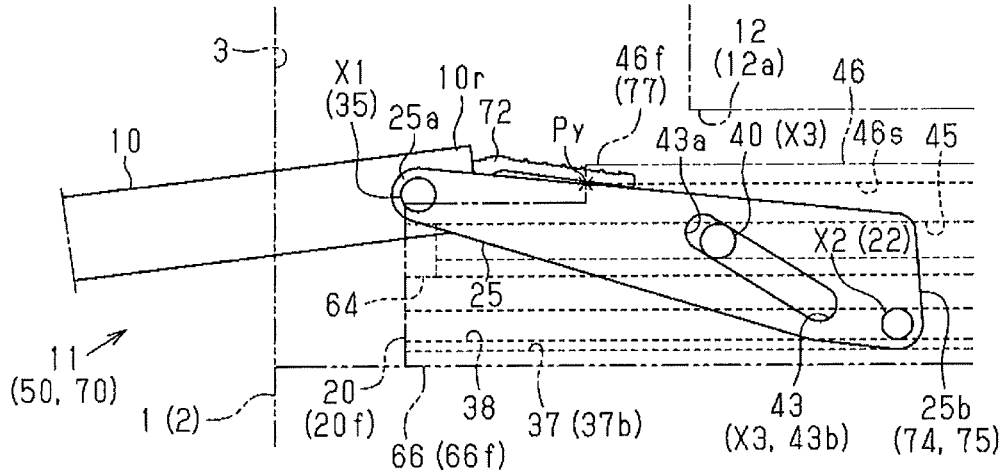

As illustrated in FIGS. 14A to 14C, in a state where each slope plate 10 is deployed to the door opening portion 3, the slope apparatus 11 of the present embodiment is configured such that each link member 25 abuts on the front end 46f of the top plate portion 46 as each link member 25 moves to the rear end portion 20r side of each guide rail 20 in conjunction with each drive shoe 22. Furthermore, in the slope apparatus 11 of the present embodiment, in this state, each drive shoe 22 further moves to the rear end portion 20r side of each guide rail 20, so that each link member 25 rotates (counterclockwise direction in FIGS. 14A to 14C) with a portion that abuts on the front end 46f of the top plate portion 46 as a second rotation fulcrum Py. Thus, the slope apparatus 11 of the present embodiment is configured to move the slope plate 10 in the storing direction in conjunction with each drive shoe 22 toward the rear end portion 20r side of each guide rail 20 while lowering the rear end portion 10r of the slope plate 10 lifted upward.

That is, in the slope apparatus 11 of the present embodiment, the front end 46f of the top plate portion 46 functions as a return fulcrum forming portion 77 that forms the second rotation fulcrum Py at each link member 25. The abutting position of each link member 25 with respect to the front end 46f of the top plate portion 46 gradually moves to the first end portion 25a side where the first connection point X1 with respect to the rear end portion 10r of the slope plate 10 is provided as each of these link members 25 moves in conjunction with each drive shoe 22 toward the rear end portion 20r side of each guide rail 20 while rotating. Each link member 25 of the present embodiment is configured such that the first end portion 25a comes into slide contact with the lower surface 46s of the corresponding top plate portion 46 by the movement of the second rotation fulcrum Py.

That is, as illustrated in FIG. 7A, in the slope apparatus 11 of the present embodiment, the posture holding mechanism 50 based on the engaged state of each link member 25 with respect to each guide rail 20 functions again. Then, the slope apparatus 11 of the present embodiment is configured to store the slope plate 10 deployed to the outside of the vehicle in the storing box 12 in a manner that it is pulled in by moving the slope plate 10 to the rear end portion 20r side of the guide rail 20 integrally with each of the link members 25 and the drive shoes 22.

Next, the effect of the present embodiment will be described.

(1) The slope apparatus 11 includes a guide rail 20 that extends in the deploying and storing direction of the slope plate 10, the drive shoe 22 that moves in the extending direction of the guide rail 20, and a link member 25 that has a first connection point X1 rotatably connected to the rear end portion 10r of the slope plate 10 and a second connection point X2 rotatably connected to the drive shoe 22. Moreover, the slope apparatus 11 includes a posture holding mechanism 50 configured to move the slope plate 10 in the extending direction of the guide rail 20 in conjunction with the drive shoe 22 in a state where the posture of the link member 25 is held based on the engaged state of the link member 25 to the guide rail 20. Furthermore, in the slope apparatus 11, a rotation fulcrum Px of the link member 25 is formed between the first connection point X1 and the second connection point X2 in a state where the slope plate 10 is deployed to the door opening portion 3 by moving the rear end portion 10r of the slope plate 10 to the front end portion 20f of the guide rail 20. Thus, the slope apparatus 11 includes a lift mechanism 70 configured to rotate the link member 25 by changing the interval d between the rotation fulcrum Px and the second connection point X2 in the extending direction of the guide rail 20 based on the movement of the drive shoe 22 from the rear end portion 20r side toward the front end portion 20f side of the guide rail 20 and lift the rear end portion 10r of the slope plate 10.

According to the above-described configuration, based on the driving force of the drive shoe 22 that moves from the rear end portion 20r side toward the front end portion 20f side of the guide rail 20 in succession to the operation of deploying the slope plate 10 to the door opening portion 3, the link member 25 can be rotated in the direction of lifting the rear end portion 10r of the slope plate 10. Furthermore, the lifting position of the rear end portion 10r can be randomly set based on the amount of rotation of the link member 25 and the length of the link member 25 in this case. Thus, the slope plate 10 can be arranged closer to the vehicle floor 71.

The apparatus can be reduced in size by utilizing a simple configuration. In particular, since the lift mechanism 70 that rotates the link member 25 is formed based on the movement of the drive shoe 22 along the extending direction of the guide rail 20 while the link member 25 rotates with the slope plate 10 deployed to the door opening portion 3, the thickness in the vertical direction can be easily reduced. Thus, the mountability with respect to the vehicle 1 can be improved.

For example, it can be mounted on a low floor vehicle. Moreover, the slope of the slope plate 10 can be thereby made gentle. As a result, better getting on and off property can be ensured.

(2) The slope apparatus 11 includes a driven shoe 40 that is connected to the link member 25 and moves in the extending direction of the guide rail 20 together with the link member 25 by being connected to the link member 25 at a position between the first connection point X1 and the second connection point X2. The lift mechanism 70 is configured such that the link member 25 rotates about, as a rotation fulcrum Px, the third connection point X3 where the driven shoe 40 is connected to the link member 25.

According to the above-described configuration, the link member 25 can be stably supported by the drive shoe 22 and the driven shoe 40. Thus, the link member 25 can be stably rotated by setting the third connection point X3 formed by the driven shoe 40 as the rotation fulcrum Px.

(3) The third connection point X3 is formed by inserting the shaft-like portion 40a of the driven shoe 40 through the long hole 43 provided in the link member 25. The lift mechanism 70 includes the stopper portion 64 that restricts the movement of the driven shoe 40 toward the front end portion 20f side of the guide rail 20 by abutting on the driven shoe 40 in a state where the slope plate 10 is deployed to the door opening portion 3.

That is, the link member 25 rotates about the shaft-like portion 40a of the driven shoe 40 inserted through the long hole 43 as a fulcrum. Furthermore, apparently, by moving the shaft-like portion 40a in the long hole 43, the separation distance between the third connection point X3 for the driven shoe 40 and the second connection point X2 for the drive shoe 22 formed by the long hole 43 and the shaft-like portion 40a changes. Therefore, the drive shoe 22 is continuously allowed to move from the rear end portion 20r side toward the front end portion 20f side of the guide rail 20 even after the driven shoe 40 abuts on the stopper portion 64. That is, the interval d between the rotation fulcrum Px of the link member 25 and the second connection point X2 with respect to the drive shoe 22 in the extending direction changes when the drive shoe 22 moves along the extending direction of the guide rail 20 in a state in which the movement of the driven shoe 40 is restricted. Thus, the link member 25 engaged with the guide rail 20 can be stably rotated via the drive shoe 22 and the driven shoe 40.

(4) The lift mechanism 70 is configured such that the first connection point X1 with respect to the rear end portion 10r of the slope plate 10 moves to the rear end portion 20r side of the guide rail 20 from the rotation fulcrum Px by the rotation of the link member 25.

According to the above-described configuration, the rear end portion 10r of the slope plate 10 can be brought closer to the edge portion 71e of the vehicle floor 71 facing the door opening portion 3 from the direction in which the slope plate 10 is deployed to the door opening portion 3, that is, the direction in which the door opening portion 3 opens to the outside of the vehicle. Thus, the slope plate 10 can be arranged closer to the vehicle floor 71.

(5) The slope apparatus 11 is configured such that the second connection point X2 of the link member 25 with respect to the drive shoe 22 moves to the front end portion 20f side of the guide rail 20 beyond the rotation fulcrum Px based on the movement of the drive shoe 22 toward the front end portion 20f side of the guide rail 20.

According to the above-described configuration, the first connection point X1 of the link member 25 with respect to the rear end portion 10r of the slope plate 10 can be stably moved to the rear end portion 20r side of the guide rail 20 with respect to the rotation fulcrum Px.

(6) The rear end portion 10r of the slope plate 10 is provided with an engagement portion 72 that engages with an edge portion 71e of the vehicle floor 71 that faces the door opening portion 3 in a state where the link member 25 is lifted upward by the rotation of the link member 25.

According to the above-described configuration, the load on the slope plate 10 can be supported by the vehicle floor 71. Thus, the load on the load on the lift mechanism 70 can be reduced to ensure high reliability and durability.

In particular, by combining with the configurations of (4) and (5) above, the rear end portion 10r of the slope plate 10 lifted by the rotation of the link member 25 approaches the edge portion 71e of the vehicle floor 71 while gently descending. Thus, a favorable engaged state with respect to the vehicle floor 71 can be ensured.

(7) In the second end portion 25b of the link member 25 provided with the second connection point X2, a rotation restricting portion 74 that restricts the rotation of the link member 25 by abutting on the bottom plate portion 66 provided on the guide rail 20 from above is provided in the state where the rear end portion 10r of the slope plate 10 is lifted upward by the rotation of the link member 25.

According to the above-described configuration, the rotation amount of the link member 25 can be defined with a simple configuration. Thus, the slope plate 10 can be arranged closer to the vehicle floor 71. In addition, the load applied to the link member 25 can be supported by the bottom plate portion 66 of the guide rail 20 on which the rotation restricting portion 74 abuts. Thus, high reliability and durability can be ensured.

(8) The lift mechanism 70 includes a return fulcrum forming portion 77 that abuts on the link member 25 and forms a second rotation fulcrum Py on the link member 25 when the link member 25 moves toward the rear end portion 20r side of the guide rail 20 in conjunction with the drive shoe 22 in a state where the slope plate 10 is deployed to the door opening portion 3.

According to the above-described configuration, the link member 25 can be rotated in a direction in which the rear end portion 10r of the slope plate 10 is lowered stably based on the movement of the drive shoe 22 toward the rear end portion 20r side of the guide rail 20. Then, the slope plate 10 can be moved in the storing direction integrally with the link member 25 continuously with the lowering operation.

(9) The slope apparatus 11 includes a drive cable 51 that is connected to drive shoe 22, a sliding path 58 that extends along the extending direction of the guide rail 20, and an actuator 52 that causes the drive cable 51 to slide along the sliding path 58.

According to the above-described configuration, the drive shoe 22 can be stably moved in the extending direction of the guide rail 20 with a simple configuration. Then, by taking advantage of the simple configuration and reducing the size, the mountability with respect to the vehicle 1 can be improved.

(10) The posture holding mechanism 50 holds the link member 25 in a posture in which the first connection point X1 with respect to the rear end portion 10r of the slope plate 10 is disposed above the second connection point X2 for the drive shoe 22 and in the direction in which the slope plate 10 is deployed.

According to the above-described configuration, in succession to the operation of deploying the slope plate 10 to the door opening portion 3, the link member 25 can be quickly rotated in the direction in which the rear end portion 10r of the slope plate 10 is lifted by forming a rotation fulcrum Px between the first connection point X1 and the second connection point X2 based on the movement of the drive shoe 22 toward the front end portion 20f side of the guide rail 20.

(11) The guide rail 20 includes a drive guide portion 38 that guides the drive shoe 22 in the extending direction of the guide rail 20 by engaging with the drive shoe 22 and a driven guide portion 45 that guides the driven shoe 40 in the extending direction of the guide rail 20 by engaging with the driven shoe 40.

According to the above-described configuration, the drive shoe 22 and the driven shoe 40 can be stably moved in the extending direction of the guide rail 20. Then, the posture of the link member 25 can be stabilized by engaging the link member 25 with the guide rail 20 via the drive shoe 22 and the driven shoe 40.

(12) The guide rail 20 includes a top plate portion 46 that extends in the extending direction of the guide rail 20 above the drive guide portion 38 and the driven guide portion 45. Then, the posture holding mechanism 50 holds the posture of the link member 25 in a state in which the first end portion 25a of the link member 25 provided with the first connection point X1 comes into slide contact with the lower surface 46s of the top plate portion 46.

That is, the rotation of the link member 25 in the direction in which the rear end portion 10r of the slope plate 10 connected to the first end portion 25a is lifted can be restricted as the first end portion 25a of the link member 25 comes into slide contact with the lower surface 46s of the top plate portion 46. Thus, the posture of the link member 25 can be held with a simple configuration.

(13) The guide rail 20 is configured such that the first end portion 25a of the link member 25 is detached from the top plate portion 46 in a state where the drive shoe 22 is engaged with the drive guide portion 38 by moving the drive shoe 22 to the front end portion 20f of the guide rail 20.

According to the above-described configuration, while the length of the front end portion 20f of the guide rail 20 protruding from the storing box 12 is suppressed, the link member can be largely rotated in a state where the slope plate 10 is deployed to the door opening portion 3. Thus, the slope plate 10 can be arranged closer to the vehicle floor 71.

(14) The guide rail 20 is configured such that the link member 25 abuts on the front end 46f of the top plate portion 46 when the link member 25 moves toward the rear end portion 20r side of the guide rail 20 in conjunction with the drive shoe 22 in a state where the slope plate 10 is deployed to the door opening portion 3.

According to the above-described configuration, the front end 46f of the top plate portion 46 functions as a return fulcrum forming portion 77 that forms the second rotation fulcrum Py on the link member 25. Furthermore, the abutting position of the top plate portion 46 with respect to the front end 46f moves to the first end portion 25a side by moving to the rear end portion 20r side of the guide rail 20 while the link member 25 rotates in conjunction with the drive shoe 22. Thus, the posture holding mechanism 50 based on the engaged state of the link member 25 with respect to the guide rail 20 functions again by being in a state where the first end portion 25a of the link member 25 comes into slide contact with the lower surface 46s of the top plate portion 46. Thereby, according to the above-described configuration, the slope plate 10 can be moved in the storing direction more smoothly, continuously with the lowering operation of the rear end portion 10r.

(15) The slope apparatus 11 includes a slope support portion 48 having a roller 48a as a rotating member that abuts on the lower surface 10s of the slope plate 10 in a state where the slope plate 10 moves in the extending direction of the guide rail 20 in conjunction with the drive shoe 22. Thus, the slope plate 10 can be moved in the deploying and storing direction in a stable posture.

Second Embodiment

Hereinafter, a second embodiment in which a slope apparatus for a vehicle is embodied will be described with reference to the drawings. For convenience of explanation, the same components as those in the first embodiment are denoted by the same reference numerals, and the description thereof is omitted.

As illustrated in FIGS. 15 to 18, a slope apparatus 11B of the present embodiment is different from the slope apparatus 11 of the first embodiment in the configuration of a posture holding mechanism 50B (50) and a lift mechanism 70B (70).

In more detail, in the slope apparatus 11B of the present embodiment, each driven shoe 40B has a shaft-like shape that penetrates a link member 25B in the thickness direction (direction orthogonal to the paper surface in FIGS. 15 to 18). Moreover, each link member 25B of the present embodiment is configured such that the disposal of the third connection point X3 with respect to each driven shoe 40B set between the first connection point X1 and the second connection point X2 does not change. Furthermore, in the slope apparatus 11B of the present embodiment, the shaft end portion of each driven shoe 40B engages with the driven guide portion 45B of each guide rail 20B. Thus, each driven shoe 40B of the present embodiment is configured to move along the extending direction of each guide rail 20B while being guided by each of these driven guide portions 45B.

Figure 15:
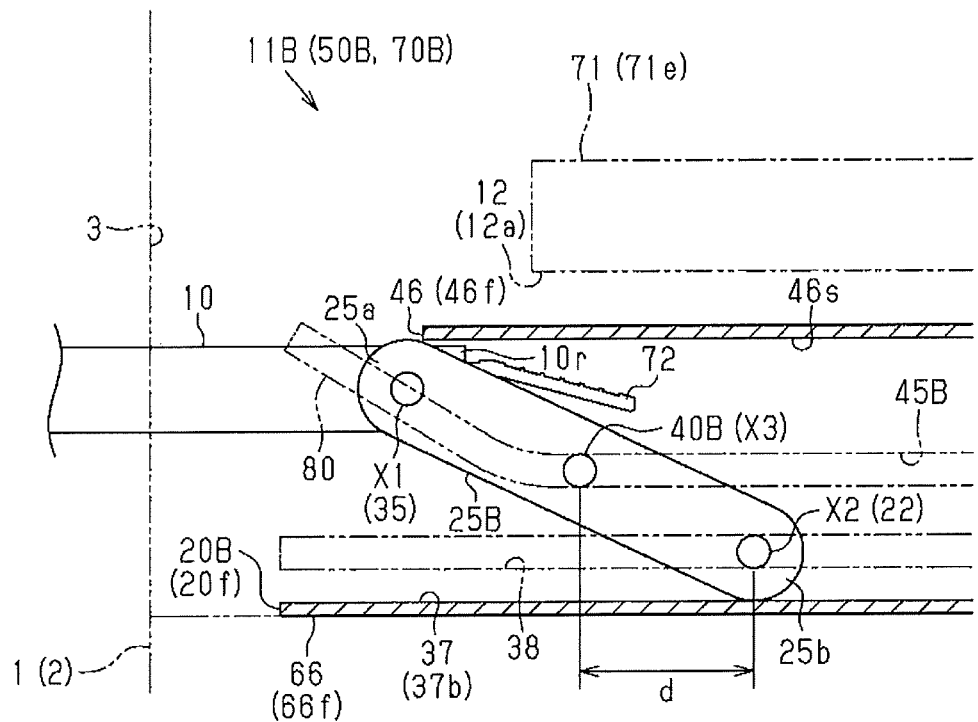
FIG. 15 is a sectional view of a slope apparatus according to a second embodiment before a rotation fulcrum is formed.

In more detail, each driven guide portion 45B of the present embodiment extends substantially parallel to each drive guide portion 38 that guides each of these drive shoes 22 in the deploying and storing operation area in which the slope plate 10 is moved along the extending direction of each guide rail 20B integrally with each drive shoe 22 (see FIG. 15, the region on the rear end portion 20r side of a curved portion 80 described later). Thus, the slope apparatus 11B of the present embodiment has a configuration in which the posture holding mechanism 50B is formed as this restricts the relative position of each drive shoe 22 and each driven shoe 40B and restricts the rotation of each link member 25B.

Each driven guide portion 45B of the present embodiment includes a curved portion 80 that extends upward from the rear end portion 20r side of each guide rail 20B toward the front end portion 20f side in the front end portion 20f side of each guide rail 20B where the slope plate 10 is deployed to the door opening portion 3. Thus, the lift mechanism 70B is formed in the slope apparatus 11B of the present embodiment.

Figure 16:
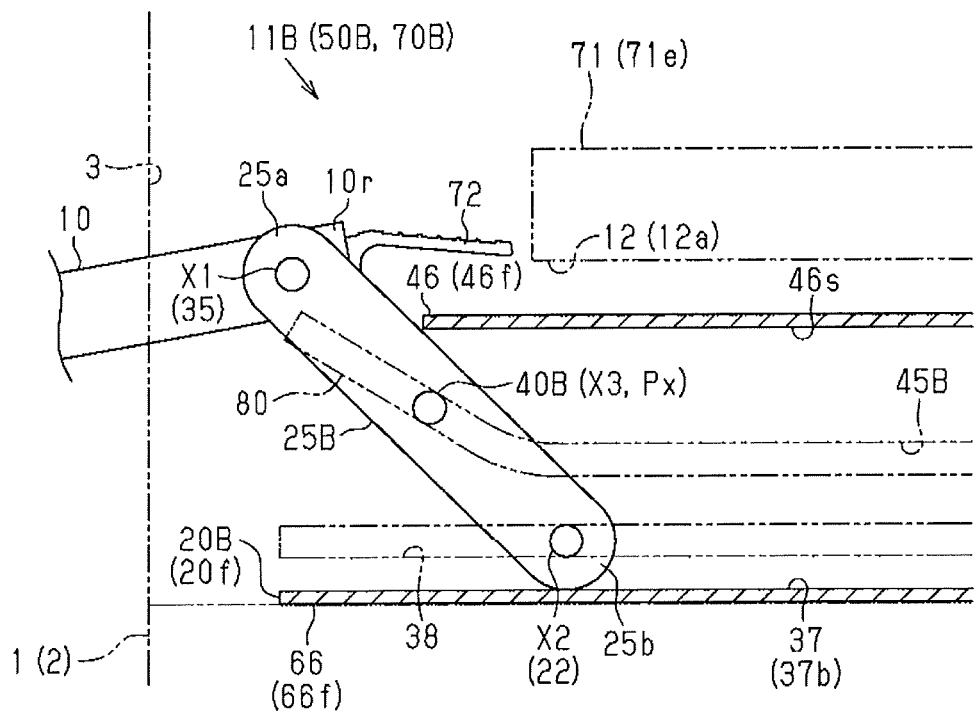
FIG. 16 is a sectional view of formation of a rotation fulcrum and rotation of a link member in the slope apparatus according to the second embodiment.
Figure 17:
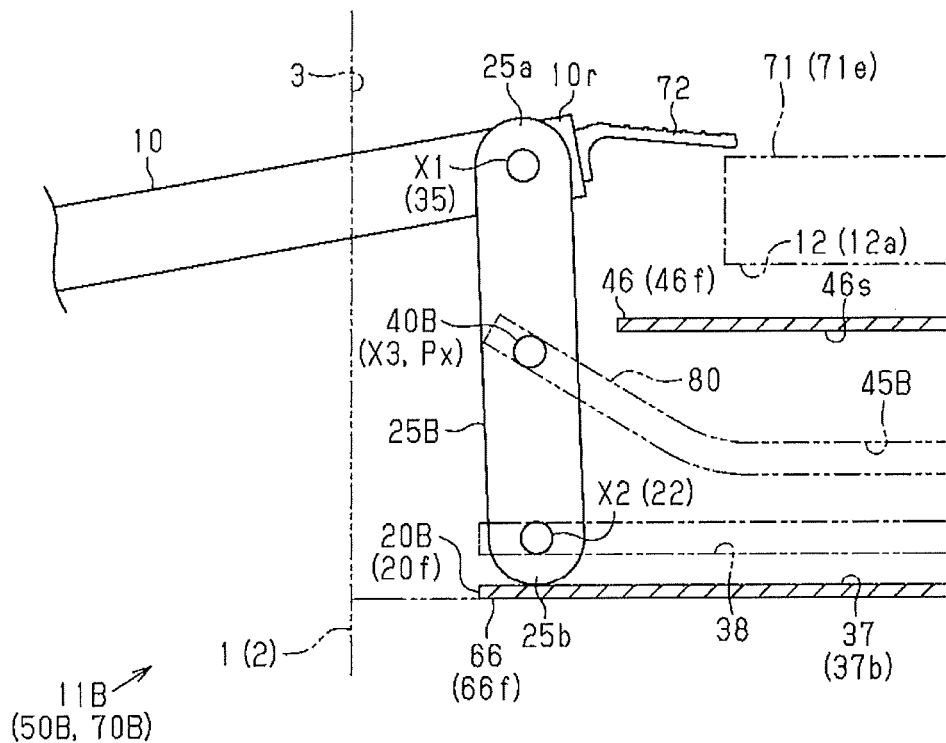
FIG. 17 is a sectional view of the slope apparatus according to the second embodiment at an uppermost position.
Figure 18:
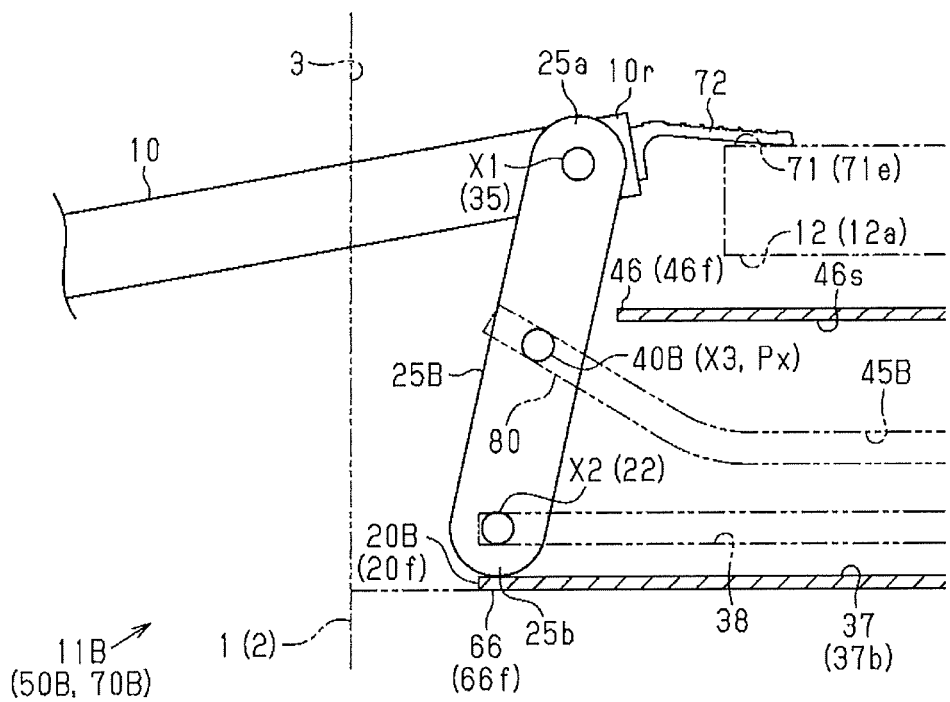
FIG. 18 is a sectional view of the slope apparatus according to the second embodiment at a rear movement position.
Figure 19:
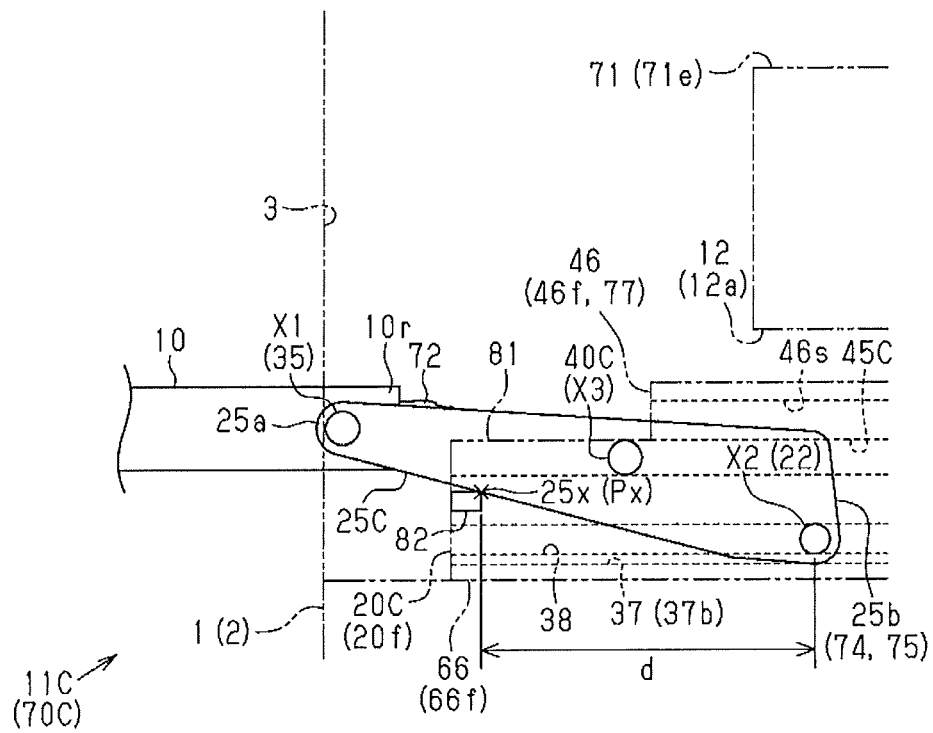
FIG. 19 is a side view of formation of a rotation fulcrum in a slope apparatus according to a third embodiment.
Figure 20:
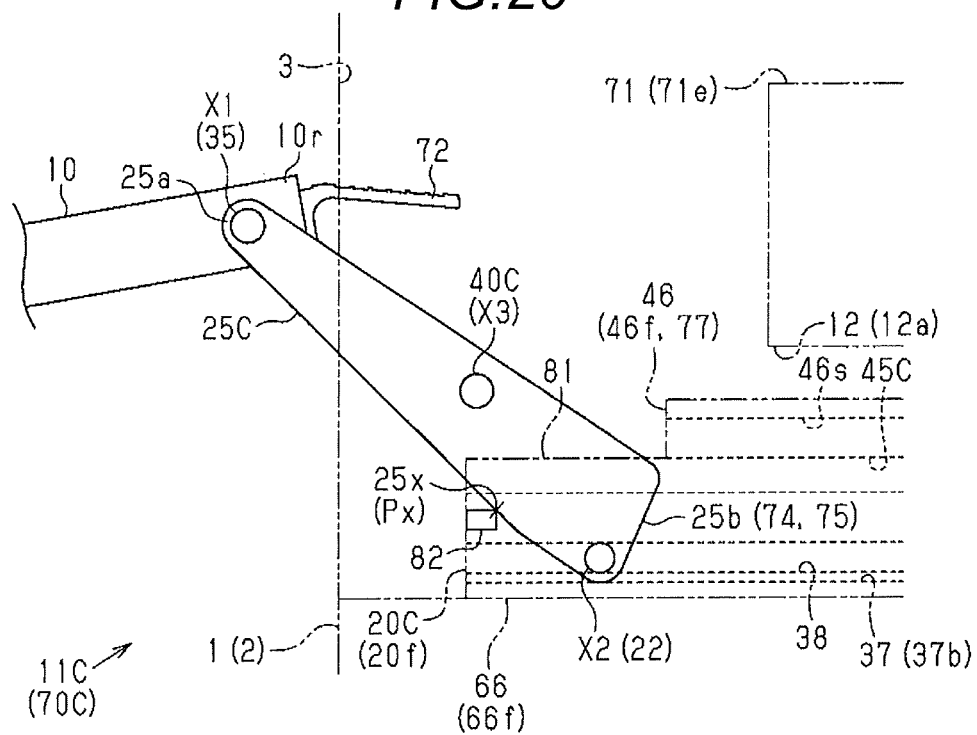
FIG. 20 is a side view of rotation of a link member in the slope apparatus according to the third embodiment.
Figure 21:
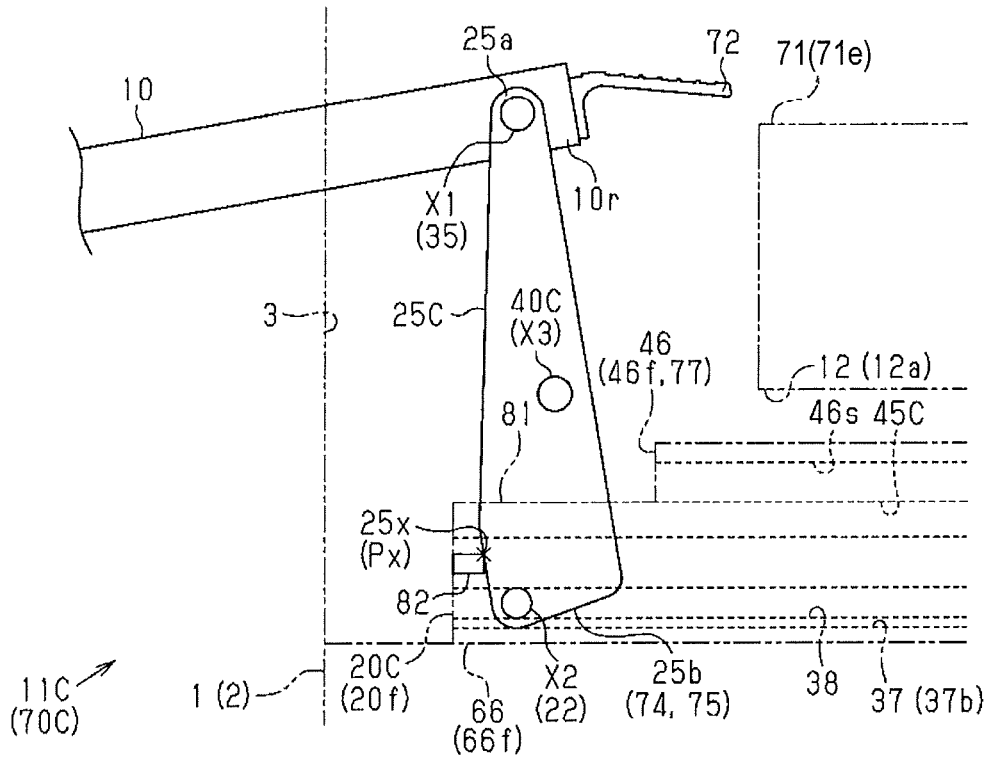
FIG. 21 is a side view of the slope apparatus according to the third embodiment at an uppermost position.

That is, as illustrated in FIGS. 16 to 18, each driven shoe 40B moves in the extending direction of each guide rail 20B in conjunction with each drive shoe 22 while being displaced in the vertical direction by being guided by the curved portion 80 at the front end portion 20f of each guide rail 20B that each driven shoe 40B engages with the curved portion 80 of each driven guide portion 45B.

However, at this time, since the position of the third connection point X3 with respect to each driven shoe 40B provided on each link member 25B does not change, the linear distance connecting the third connection point X3 and the second connection point X2 with respect to the drive shoe 22 is constant. Therefore, in the slope apparatus 11B of the present embodiment, each link member 25B rotates about the third connection point X3 as the rotation fulcrum Px as the interval d between the third connection point X3 and the second connection point X2 in the extending direction of each guide rail 20B changes by moving each drive shoe 22 in a state in which the slope plate 10 is deployed (clockwise direction in FIGS. 16 to 18). Thus, in the lift mechanism 70B of the present embodiment, the rear end portion 10r of the slope plate 10 connected to the first end portion 25a of each link member 25B is lifted upward based on the movement of the drive shoe 22 toward the front end portion 20f side from the rear end portion 20r side of the guide rail 20B.

As described above, the same effects as those of the first embodiment can also be obtained by the configuration of the present embodiment. The posture holding mechanism 50B holds the posture of each link member 25B based on the engaged state of each link member 25B to each guide rail 20B via each drive shoe 22 and each driven shoe 40B. Thus, the slope plate 10 can be stably moved in the deploying and storing directions integrally with the link members 25B in the state of holding the posture of each link member 25B with a simple configuration.

Third Embodiment

Hereinafter, a third embodiment of a slope apparatus for a vehicle will be described with reference to the drawings. For convenience of explanation, the same reference numerals are given to the same configurations as those of the above-described embodiments, and description thereof is omitted.

As illustrated in FIGS. 19 to 22, the slope apparatus 11C of the present embodiment is different in the configuration of a lift mechanism 70C (70, 70B) compared to the slope apparatuses 11 and 11B in the above embodiments.

In more detail, in the slope apparatus 11C of the present embodiment, each driven guide portion 45C extends substantially parallel to each drive guide portion 38 over the entire extending direction of each guide rail 20C. Moreover, each driven guide portion 45C of the present embodiment has an upper opening portion 81 that opens upward (upward in FIGS. 19 to 22) in the front end portion 20f of each guide rail 20C where the slope plate 10 is deployed to the door opening portion 3. Thus, the slope apparatus 11C of the present embodiment is configured to allow the rotation of each link member 25C in a state where the slope plate 10 is deployed to the door opening portion 3 as each driven shoe 40C is detached upward from each driven guide portion 45C via its upper opening portion 81.

Each driven shoe 40C of the present embodiment has the same configuration as each driven shoe 40B in the second embodiment. Thus, each driven guide portion 45C also has the same groove shape (except for the curved portion 80) as each driven guide portion 45B in the second embodiment except for the portion where the upper opening portion 81 is formed.

The slope apparatus 11C of the present embodiment includes a pair of abutting members 82 and 82 that abuts against the link members 25C as each link member 25C moves integrally with each drive shoe 22 from the rear end portion 20r side toward the front end portion 20f side of each guide rail 20C in a state where the slope plate 10 is deployed to the door opening portion 3. Specifically, each abutting member 82 of the present embodiment is configured to abut on each link member 25C at a position between the first connection point X1 for the slope plate 10 and the second connection point X2 for each drive shoe 22. Furthermore, the slope apparatus 11C of the present embodiment is configured such that the rotation fulcrum Px of each link member 25C is formed at the abutting portion 25x with respect to each abutting member 82 as each link member 25C moves to the front end portion 20f side of each guide rail 20C in this state. Thus, in the slope apparatus 11C of the present embodiment, a lift mechanism 70C that lifts the rear end portion 10r of the slope plate 10 upward is formed based on the driving force of each drive shoe 22 moving toward the front end portion 20f side of each guide rail 20C.

That is, in the slope apparatus 11C of the present embodiment, the interval d between the abutting portion 25x of each link member 25 with respect to each abutting member 82 in the extending direction and the second connection point X2 with respect to each drive shoe 22 changes as each link member 25C moves to the front end portion 20f side of each guide rail 20C in a state of being abutted on each abutting member 82. Specifically, as the drive shoe 22 moves toward the front end portion 20f side of each guide rail 20B, the interval d between the second connection point X2 and the abutting portion 25x with respect to each abutting member 82 is reduced as the abutting portion 25x of each link member 25C with respect to each abutting member 82 moves to the second end portion 25b side where the second connection point X2 is provided. Thus, in the slope apparatus 11C of the present embodiment, each link member 25C is configured to rotate in the direction of lifting the rear end portion 10r of the slope plate 10 connected to the first end portion 25a with the abutting portion 25x for each of the abutting members 82 as a rotation fulcrum Px (clockwise direction in FIGS. 19 to 22).

Figure 22:
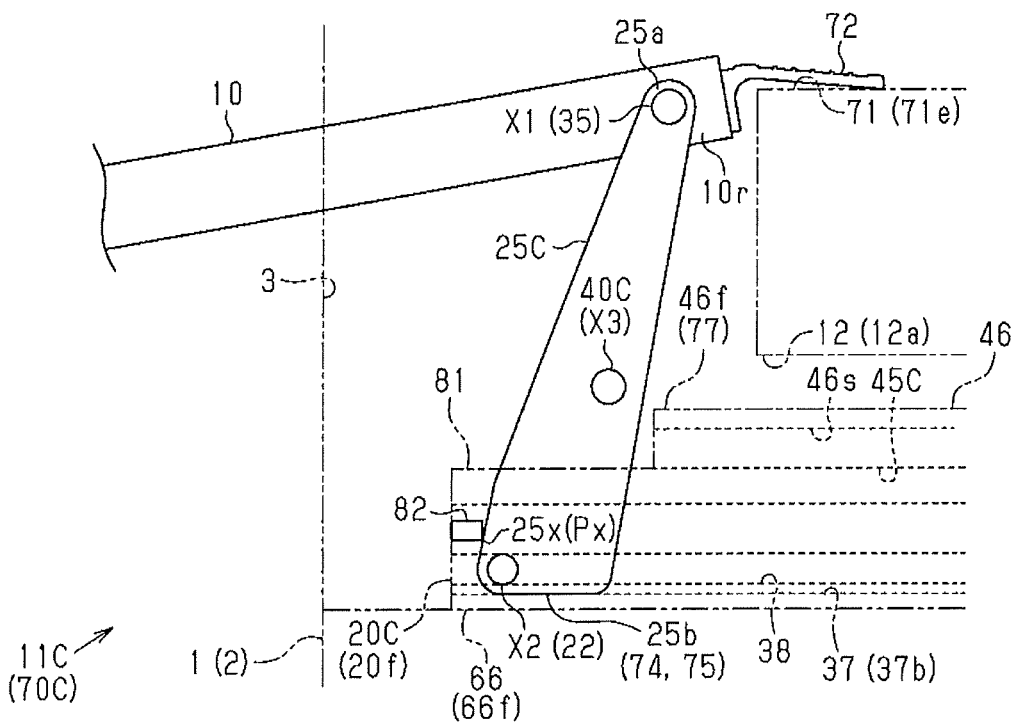
FIG. 22 is a side view of the slope apparatus according to the third embodiment at a rear movement position.

As illustrated in FIG. 22, in the slope apparatus 11C of the present embodiment, the first connection point X1 moves to the rear end portion 20r side of the guide rail 20 from the rotation fulcrum Px before the second connection point X2 moves to the front end portion 20f side of the guide rail 20 beyond the rotation fulcrum Px of the link member 25C. Thus, in the slope apparatus 11C of the present embodiment, the engagement portion 72 provided at the rear end portion 10r of the slope plate 10 is configured to engage with the edge portion 71e of the vehicle floor 71 facing the door opening portion 3 in this state.

As described above, the same effects as those of the above embodiments can be obtained also by the configuration of the present embodiment. Thus, by taking advantage of the simple configuration, further downsizing can be achieved.

Fourth Embodiment

Hereinafter, a fourth embodiment in which a slope apparatus for a vehicle is embodied will be described with reference to the drawings. For convenience of explanation, the same reference numerals are given to the same configurations as those of the above-described embodiments, and description thereof is omitted.

Figure 23:
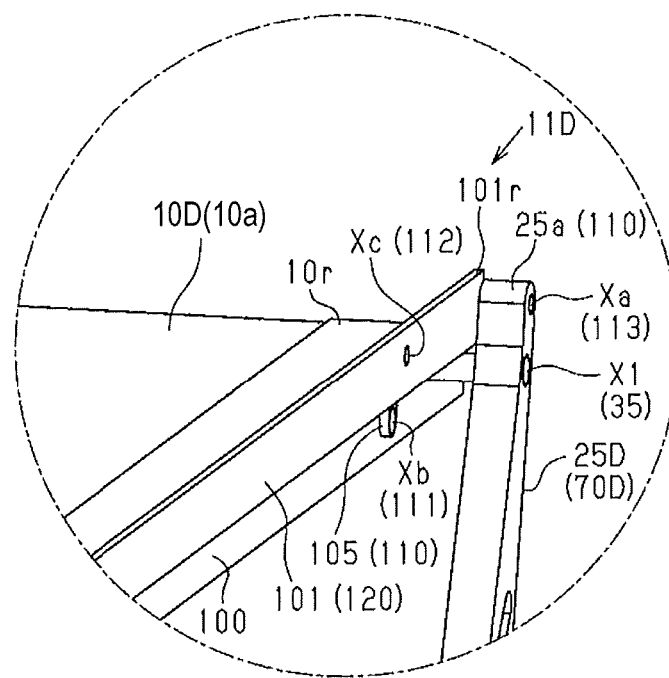
FIG. 23 is a perspective view of a slope plate with a fall-off prevention member in a lifted state.
Figure 24:
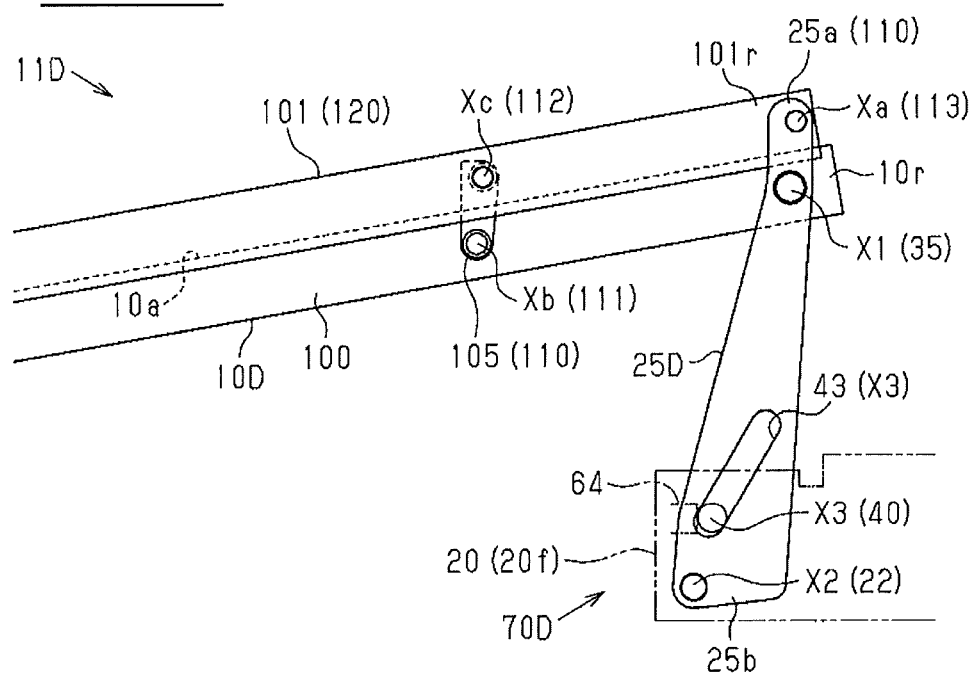
FIG. 24 is a side view of the slope plate with the fall-off prevention member in the lifted state.

As illustrated in FIGS. 23 and 24, a slope apparatus 11D of the present embodiment includes a pair of fall-off prevention members 101 and 101 held on the sides of a slope plate 10D in side end portions 100 on both sides in the width direction of the slope plate 10D.

In the slope apparatus 11D of the present embodiment, each of these fall-off prevention members 101 has a long, substantially flat outer shape. Moreover, each of these fall-off prevention members 101 extends in the longitudinal direction of the slope plate 10D, from the rear end portion 10r toward the front end portion 10f side (from the right side to the left side in FIG. 24) with the thickness direction facing the width direction of the slope plate 10D (the direction perpendicular to the paper surface in FIG. 24). Furthermore, each of these fall-off prevention members 101 is disposed on the side of the slope plate 10D in a state of protruding upward from the upper surface 10a in the state where the rear end portion 10r of the slope plate 10D is lifted upward by the operation of the lift mechanism 70D. Thus, the slope apparatus 11D of the present embodiment is configured such that an object moving on the slope plate 10D deployed to the lower end of the door opening portion 3 is difficult to fall off from the slope plate 10D.

In more detail, each fall-off prevention member 101 of the present embodiment is rotatably connected to the first end portion 25a of each link member 25D constituting the lift mechanism 70D. Specifically, when the first end portion 25a of each link member 25D is the tip end of each link member 25D, each of these fall-off prevention members 101 has a rotation connection point Xa with the link member 25D at a position on the tip end side of the first connection point X1 with respect to the rear end portion 10r of the slope plate 10D provided at the first end portion 25a of each link member 25D. Moreover, the slope apparatus 11D of the present embodiment includes a second link member 105 that is rotatably connected to the slope plate 10D and the fall-off prevention member 101 at a position on the front end portion 10f side of the slope plate 10D from the rotation connection point Xa between the link member 25D and the fall-off prevention member 101. In the slope apparatus 11D of the present embodiment, such second link members 105 are provided at a plurality of locations including the longitudinal direction of the fall-off prevention member 101 and the front end portion 10f side of the slope plate 10D (not shown). Furthermore, in the slope apparatus 11D of the present embodiment, these second link members 105 form a parallel link 110 together with the first end portion 25a of each link member 25D having a first connection point X1 with respect to the slope plate 10D and a rotation connection point Xa with the fall-off prevention member 101. Thus, in the slope apparatus 11D of the present embodiment, each fall-off prevention member 101 held on the side of the slope plate 10D is lifted to the upper surface 10a side of the slope plate 10D by rotating each link member 25D that lifts the rear end portion 10r of the slope plate 10D.

The second link member 105 of the present embodiment has a substantially flat outer shape. Moreover, the plate side connection point Xb with respect to the slope plate 10D and the wall side connection point Xc with respect to the fall-off prevention member 101 are formed by disposing shaft-like members 111 and 112 that serve as rotary shafts, respectively at both end portions in the longitudinal direction of the second link member 105. Thus, the rotational connection point Xa between the fall-off prevention member 101 and the first end portion 25a of the link member 25D is also formed by disposing a shaft-like member 113 serving as the rotational axis at the rear end portion 101r of the fall-off prevention member 101.

Figure 25:
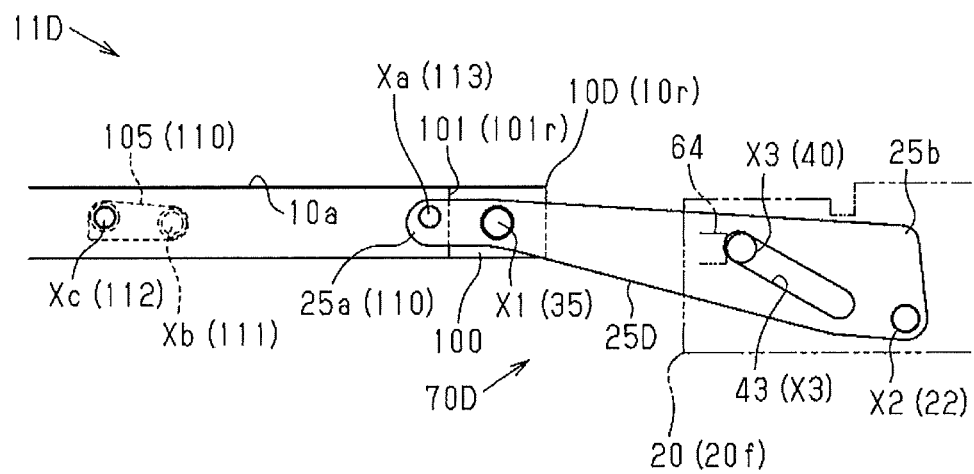
FIG. 25 is a view explaining an action of a slope apparatus according to a fourth embodiment before lifting.
Figure 26:
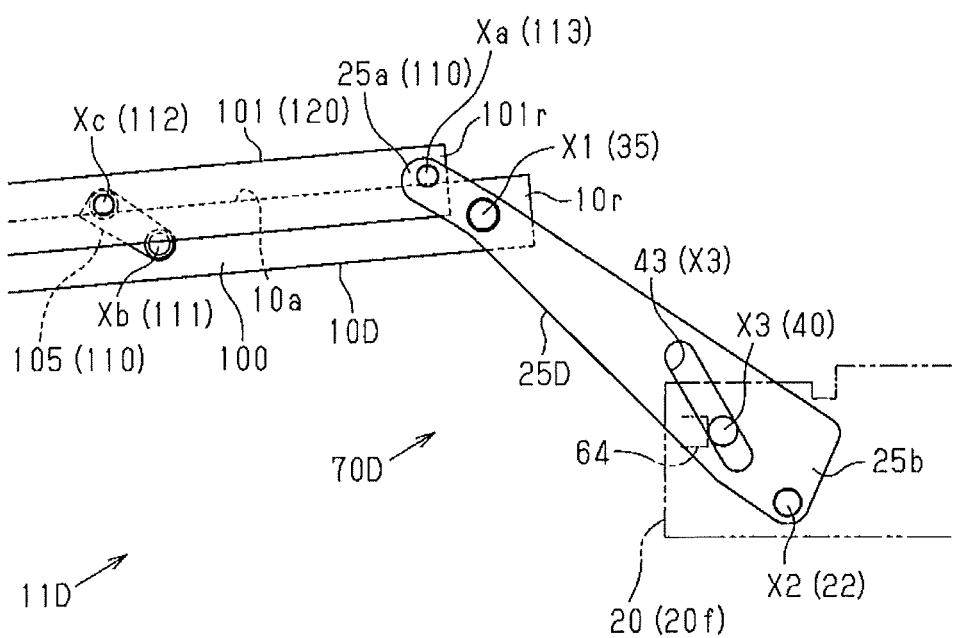
FIG. 26 is a view explaining an action of the slope apparatus according to the fourth embodiment during lifting.

That is, as illustrated in FIGS. 25 and 26, in the first end portion 25a of each link member 25D, the distal end portion where the rotation connection point Xa with the fall-off prevention member 101 is provided apparently rotates around the first connection point X1 for the slope plate 10D as center by rotating each link member 25D in the direction in which the rear end portion 10r of the slope plate 10D is lifted. Thus, in the slope apparatus 11D of the present embodiment, the rear end portion 101r of each fall-off prevention member 101 connected to the first end portion 25a of each link member 25D is lifted above the slope plate 10D.

Furthermore, in the slope apparatus 11D of the present embodiment, the second link member 105, which forms the parallel link 110 together with the first end portion 25a of each link member 25D, rotates in the clockwise direction in FIGS. 25 and 26, like each link member 25D centering on the plate side connection point Xb for the slope plate 10D in conjunction with the rotation of each link member 25D. Thus, the slope apparatus 11D of the present embodiment is configured such that each fall-off prevention member 101 is lifted above the slope plate 10D while maintaining a posture parallel to the slope plate 10D.

Moreover, when storing the slope plate 10D, the rear end portions 101r of the fall-off prevention members 101 connected to the first end portions 25a of the link members 25D are also lowered downward by rotating each link member 25D in a direction to pull down the rear end portion 10r of the slope plate 10D (rotating counterclockwise in FIGS. 25 and 26). Furthermore, each fall-off prevention member 101 is lowered to the side of the slope plate 10D while maintaining a posture parallel to the slope plate 10D as the second link member 105 is similarly rotated counterclockwise in FIGS. 25 and 26 in conjunction with the rotation of each link member 25D. Thus, the slope apparatus 11D of the present embodiment is configured to draw the slope plate 10D held in its substantially horizontal posture into a storing box 12 provided in the vehicle body 2 with each of these fall-off prevention members 101 being integrated with the side end portion 100 of the slope plate 10D.

Figure 27A:
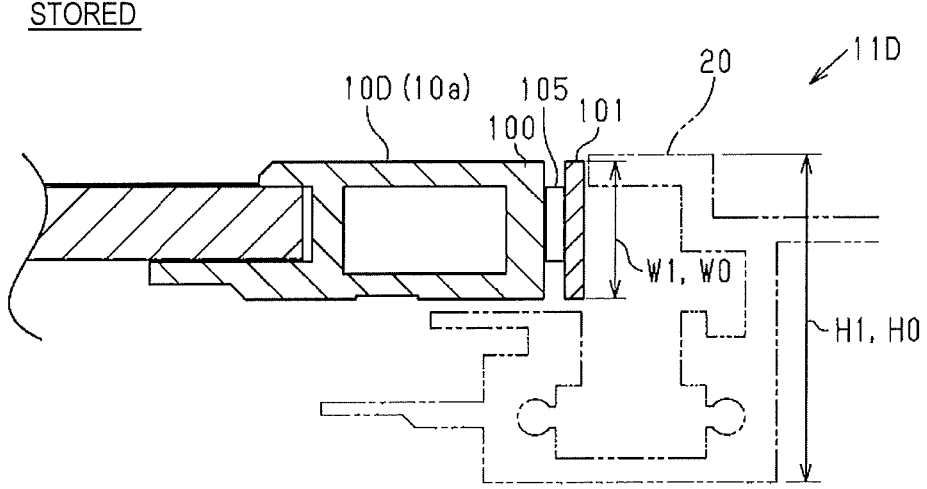
FIGS. 27A and 27B are sectional views of the slope plate provided with a fall-off prevention member.

Specifically, as illustrated in FIG. 27A, in the slope apparatus 11D of the present embodiment, the vertical width W1 of each fall-off prevention member 101 is set to be substantially equal to the thickness W0 of the slope plate 10D. Furthermore, the slope apparatus 11D of the present embodiment is set so that each fall-off prevention member 101 held on the side of the slope plate 10D does not protrude upward from the upper surface 10a of the slope plate 10D in the state where these slope plates 10D and each fall-off prevention member 101 move in the deploying and storing directions in a substantially horizontal posture. Thus, in the slope apparatus 11D of the present embodiment, the mountability with respect to the vehicle 1 is improved by setting the height H1 of each guide rail 20 disposed in the storing box 12 provided in the vehicle body 2 to the height H0 of the entire device when the slope plate 10D is stored.

Figure 27B:
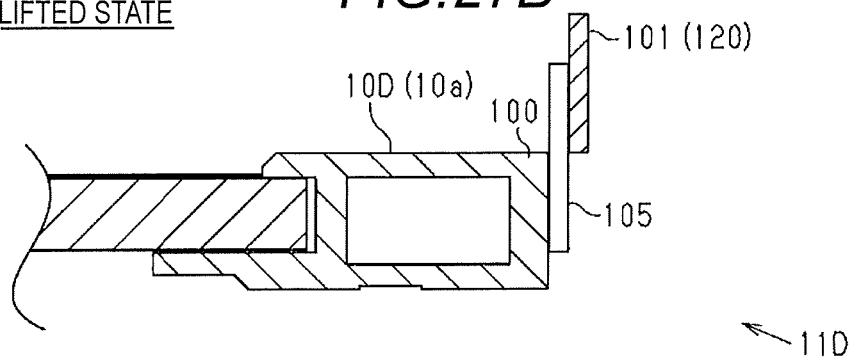

Moreover, as illustrated in FIG. 27B, in the slope apparatus 11D of the present embodiment, when the rear end portion 10r of the slope plate 10D is lifted upward by the rotation of each link member 25D constituting the lift mechanism 70D, most of the fall-off prevention members 101 are arranged in a state of protruding upward from the upper surface 10a of the slope plate 10D. Thus, each of these fall-off prevention members 101 is configured to effectively function as the side wall portion 120 for preventing the fall off.

Figure 28:
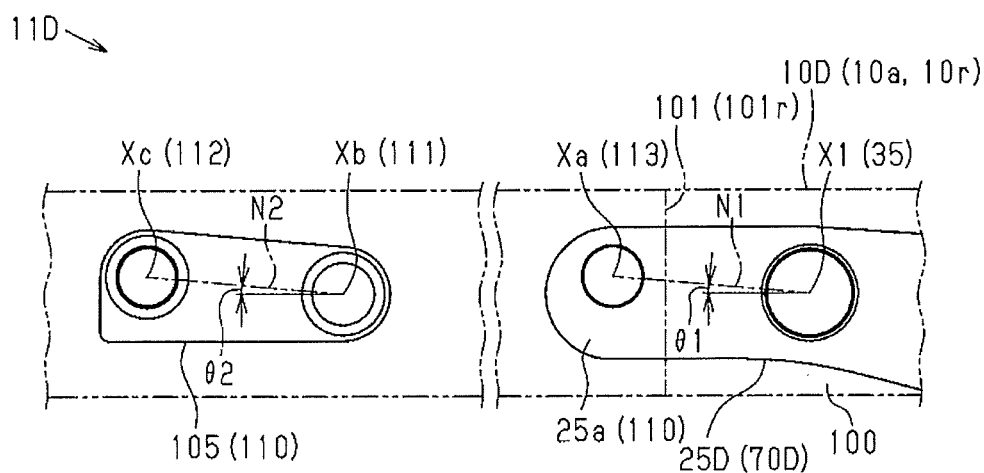
FIG. 28 is an explanatory view of a parallel link formed of a second link member which connects the slope plate and the fall-off prevention member and a first end portion of a link member.

In more detail, as illustrated in FIG. 28, in the slope apparatus 11D of the present embodiment, the rotation connection point Xa between the first end portion 25a of each link member 25 and each fall-off prevention member 101 is disposed above the first connection point X1 with respect to the slope plate 10D provided at the first end portion 25a of each link member 25 similarly. That is, when each link member 25 rotates in the direction of lifting the rear end portion 10r of the slope plate 10D, the slope apparatus 11D of the present embodiment is configured such that it is difficult to be caught at the rotation connection point Xa with each fall-off prevention member 101. As a result, it is possible to smoothly lift each fall-off prevention member 101 held on the side of the slope plate 10D upward by the rotation of each link member 25.

FIG. 28 shows the rotational position of each link member 25 whose rotational connection point Xa is disposed at the lowest position, that is, the positional relationship between the rotation connection point Xa and the first connection point X1 before lifting the slope plate 10D upward. Moreover, in the second link member 105 that forms the parallel link 110 together with the first end portion 25a of each link member 25, the length of the line segment N2 connecting the plate side connection point Xb to the slope plate 10D and the wall side connection point Xc to each fall-off prevention member 101 is substantially equal to the length of the line segment N1 connecting the rotation connection point Xa provided on each link member 25 and the first connection point X1. Furthermore, the inclination angles θ1 and θ2 formed by these line segments N1 and N2 with respect to the longitudinal direction of the slope plate 10D and the fall-off prevention member 101 are also substantially equal to each other. Therefore, in the slope apparatus 11D of the present embodiment, the wall side connection point Xc for the fall-off prevention member 101 is disposed above the plate side connection point Xb for the slope plate 10D also in the second link member 105. Thus, the slope apparatus 11D of the present embodiment can smoothly lift each fall-off prevention member 101 while maintaining a parallel posture with respect to the slope plate 10D without causing the plate side connection point Xb and the wall side connection point Xc to be caught by the rotation of the second link member 105.

Next, the effect of the present embodiment will be described.

(1) The slope apparatus 11D includes a fall-off prevention member 101 held on the side end portion 100 of the slope plate 10D. Moreover, the fall-off prevention member 101 has a rotation connection point Xa with the link member 25D at a position on the tip end side of the first connection point X1 for the slope plate 10D provided at the first end portion 25a of the link member 25D. Thus, the fall-off prevention member 101 is configured to be lifted to the upper surface 10a side of the slope plate 10D by rotating the link member 25D in the direction in which the rear end portion 10r of the slope plate 10D is lifted.

According to the above-described configuration, the fall-off prevention member 101 lifted above the upper surface 10a of the slope plate 10D forms the side wall portion 120, so that an object moving on the slope plate 10D is difficult to fall off from the slope plate 10D. Furthermore, when the slope plate 10D is stored, it can be set so that the fall-off prevention member 101 held on the side end portion 100 does not protrude upward from the upper surface 10a of the slope plate 10D. Thus, the mountability with respect to the vehicle 1 can be improved.

(2) The slope apparatus 11D includes a second link member 105 rotatably connected to the slope plate 10D and the fall-off prevention member 101 at a position on the front end portion 10f side of the slope plate 10D from the rotation connection point Xa between the link member 25D and the fall-off prevention member 101. Thus, the second link member 105 forms a parallel link 110 together with the first end portion 25a of each link member 25D having the first connection point X1 with respect to the slope plate 10D and the rotation connection point Xa with the fall-off prevention member 101.

According to the above-described configuration, the fall-off prevention member 101 can be lifted while maintaining the posture of the fall-off prevention member 101. Thus, the function as the side wall portion 120 for preventing the fall-off can be improved, and at the same time, the high designability can be ensured.

(3) The rotation connection point Xa between the first end portion 25a of the link member 25 and the fall-off prevention member 101 is located above the first connection point X1 with respect to the slope plate 10D provided at the first end portion 25a of each link member 25 similarly.

According to the above-described configuration, the catch at the rotation connection point Xa with the fall-off prevention member 101 hardly occurs when the link member 25 rotates in the direction of lifting the rear end portion 10r of the slope plate 10D. Thus, the fall-off prevention member 101 held on the side end portion 100 of the slope plate 10D can be lifted more smoothly based on the rotation of the link member 25.

Fifth Embodiment

Hereinafter, a fifth embodiment in which a slope apparatus for a vehicle is embodied will be described with reference to the drawings. For convenience of explanation, the same components as those in the first embodiment are denoted by the same reference numerals, and the description thereof is omitted.

Figure 33A:
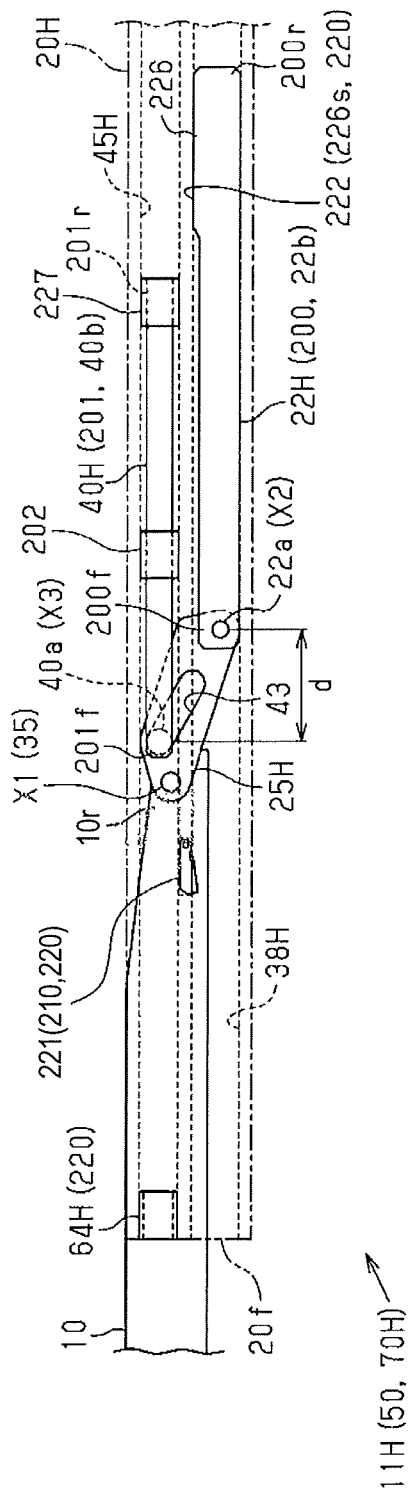
FIGS. 33A and 33B are side views of a slope apparatus according to a fifth embodiment.
Figure 33B:
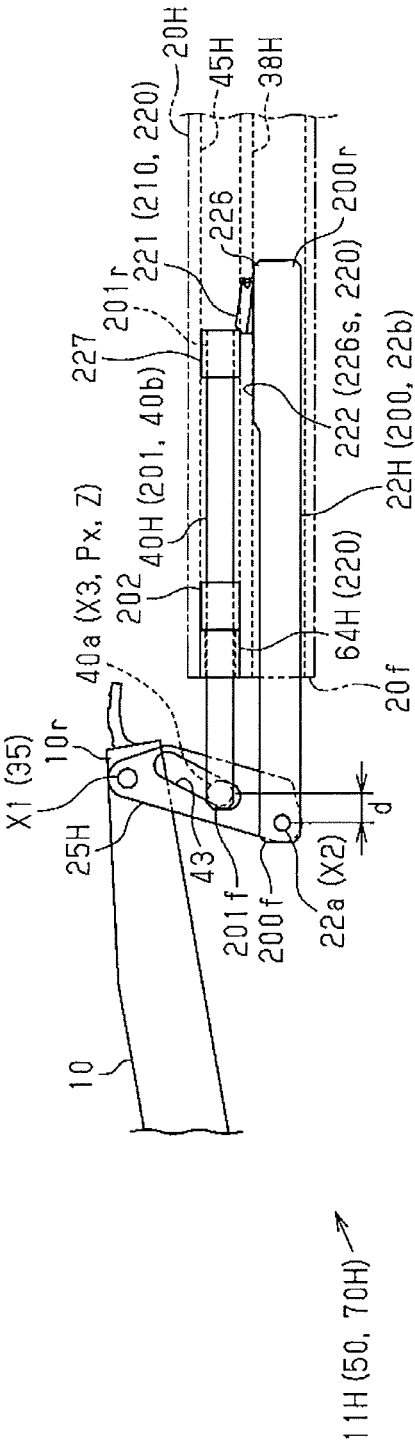
Figure 34:
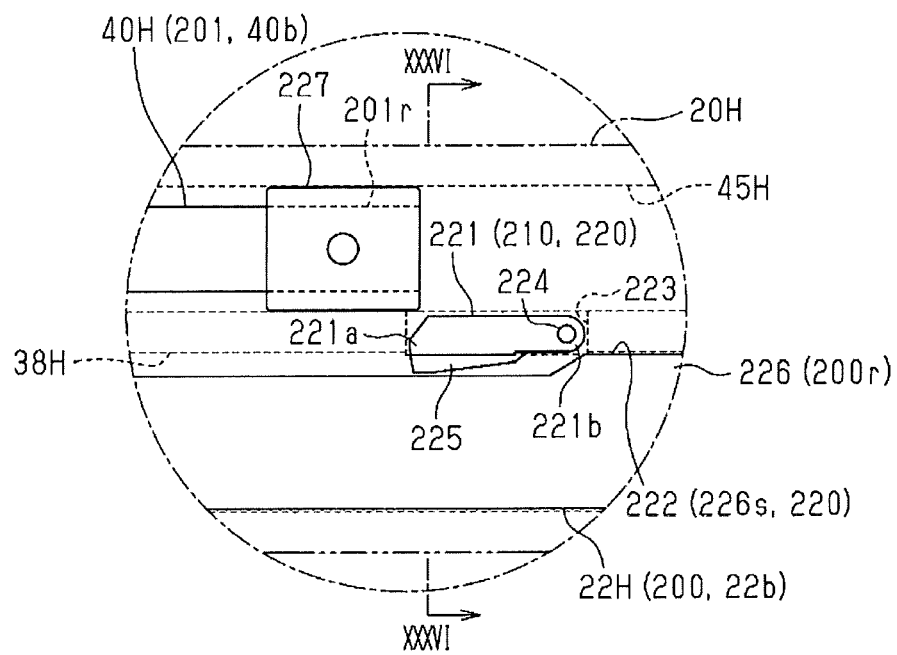
FIG. 34 is an enlarged view of a vicinity of a lever member provided at a guide rail.
Figure 35:
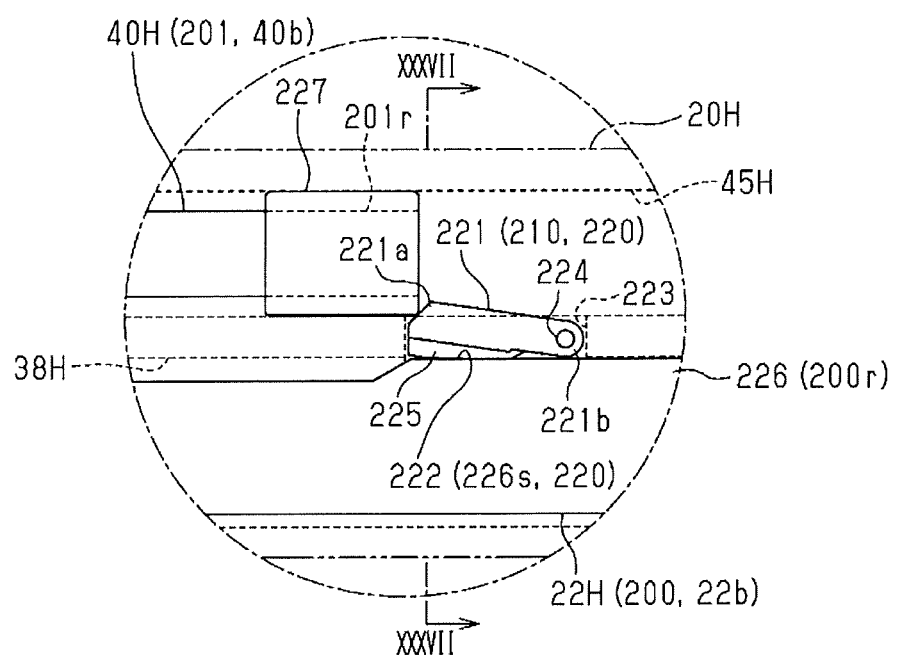
FIG. 35 is an enlarged view of the vicinity of the lever member provided at the guide rail.

As illustrated in FIGS. 33A and 33B, a slope apparatus 11H of the present embodiment is different in the configuration of a lift mechanism 70H compared to the slope apparatus 11 in the first embodiment.

In more detail, in the slope apparatus 11H of the present embodiment, a drive shoe 22H includes a long and substantially flat shoe main body 200 extending in the extending direction of a guide rail 20H. Thus, the drive shoe 22H of the present embodiment is configured to move in the extending direction of the guide rail 20H, that is, the deploying and storing directions of the slope plate 10 using the shoe main body 200 as an engagement portion 22b for the drive guide portion 38H provided on the guide rail 20H.

The drive shoe 22H of the present embodiment includes a shaft-like portion 22a that is rotatably connected to the link member 25H at the distal end portion 200f of the shoe main body 200. Thus, the slope apparatus 11H of the present embodiment is also configured such that the second connection point X2 of the link member 25H with respect to the drive shoe 22H is formed using the shaft-like portion 22a as a support shaft.

In the slope apparatus 11H of the present embodiment, a driven shoe 40H also has a long, substantially rod-like shoe main body 201 that extends in the extending direction of the guide rail 20H. Moreover, the driven shoe 40H of the present embodiment includes a shaft-like portion 40a that forms a third connection point X3 with the link member 25H by being inserted through a long hole 43 provided in the link member 25H at the distal end portion 201f of the shoe main body 201. Thus, the driven shoe 40H of the present embodiment is also configured to move in the extending direction of the guide rail 20H using the shoe main body 201 as the engagement portion 40b of the driven shoe 40H with respect to the driven guide portion 45H provided on the guide rail 20H.

Moreover, the driven shoe 40H of the present embodiment has a fitting member 202 fitted on the outer periphery of the shoe main body 201 having a square rod-like outer shape. Specifically, in the driven shoe 40H of the present embodiment, the fitting member 202 has a substantially square cylindrical shape. Furthermore, the fitting member 202 is provided at a substantially intermediate position in the longitudinal direction of the shoe main body 201. Thus, the slope apparatus 11H of the present embodiment is configured such that the movement of the driven shoe 40H toward the front end portion 20f side of the guide rail 20H is restricted as a stopper portion 64H provided at the front end portion 20f side of the guide rail 20H abuts on the fitting member 202.

In the slope apparatus 11H of the present embodiment, the stopper portion 64H has a substantially rectangular tube shape into which the shoe main body 201 of the driven shoe 40H that moves toward the front end portion 20f side of the guide rail 20H can be inserted. Thus, the slope apparatus 11H is configured such that a fitting member 202 provided on the shoe main body 201 of the driven shoe 40H abuts on the axial end face of this stopper portion 64H.

That is, in the slope apparatus 11H of the present embodiment, the slope plate 10 of the shaft-like portion 40a of the driven shoe 40H that forms the third connection point X3 of the link member 25H is deployed to the lower end of the door opening portion 3 in a state of moving forward (left side in FIG. 33) from the front end portion 20f of the guide rail 20H. Furthermore, in the slope apparatus 11H of the present embodiment, the shaft-like portion 22a of the drive shoe 22H that forms the second connection point X2 of the link member 25H is also in a state of moving forward relative to the front end portion 20f of the guide rail 20H. Thus, also in the slope apparatus 11H of the present embodiment, a lift mechanism 70H capable of lifting the rear end portion 10r of the slope plate 10 upward is formed without interfering with the front end portion 20f of the guide rail 20H by the rotation of the link member 25H.

The slope apparatus 11H of the present embodiment includes an engagement member 210 that restricts the movement of the driven shoe 40H toward the rear end portion 20r side of the guide rail 20H by engaging the shoe main body 201 of the driven shoe 40H in such a state in which the fitting member 202 of the driven shoe 40H abuts on the stopper portion 64H. Thus, in the slope apparatus 11H of the present embodiment, a position holding mechanism 220 that holds the formation position Z in the extending direction of the guide rail 20H is formed about the position of the shaft-like portion 40a inserted into the long hole 43 of the link member 25H, that is, the rotation fulcrum Px of this link member 25H in a state where the slope plate 10 is deployed.

In more detail, as illustrated in FIGS. 34 to 37, the slope apparatus 11H of the present embodiment includes a lever member 221 that is pivotally supported with respect to the guide rail 20H in a state extending in the extending direction of the guide rail 20H. Moreover, in the slope apparatus 11H of the present embodiment, the shoe main body 200 of the drive shoe 22H is provided with a cam surface 222 that comes into slide contact with the lever member 221 by moving the shoe main body 200 to the vicinity of the front end portion 20f of the guide rail 20H. Furthermore, the lever member 221 of the present embodiment is engaged with the shoe main body 201 of the driven shoe 40H by rotating by being pressed by the cam surface 222. Thus, the lever member 221 functions as an engagement member 210 constituting the position holding mechanism 220 in the slope apparatus 11H of the present embodiment.

In more detail, in the guide rail 20H of the present embodiment, a drive guide portion 38H with which the shoe main body 200 of the drive shoe 22H engages and a driven guide portion 45H with which the shoe main body 201 of the driven shoe 40H engages are arranged side by side in the vertical direction. Furthermore, the guide rail 20H has an accommodation recess 223 that opens to both the drive guide portion 38H and the driven guide portion 45H. Thus, the lever member 221 of the present embodiment is housed in the housing recess 223 in a state extending in the extending direction of the guide rail 20H.

Specifically, the lever member 221 of the present embodiment has a rotation shaft 224 at the base end portion 221b. Moreover, the lever member 221 is housed in the housing recess 223 with the distal end portion 221a extending toward the front end portion 20f side of the guide rail 20H by supporting this rotating shaft 224. Furthermore, the lever member 221 has a slide contact protruding portion 225 that protrudes downward from the distal end portion 221a. Thus, the slope apparatus 11H of the present embodiment is configured such that the lever member 221 disposed in the housing recess 223 comes into slide contact with the shoe main body 200 of the drive shoe 22H that moves below the lever member 221.

In more detail, the drive shoe 22H of the present embodiment has an upper protruding portion 226 provided at the rear end portion 200r of the shoe main body 200. Thus, in the slope apparatus 11H of the present embodiment, the upper surface 226s of the upper protruding portion 226 is used as a cam surface 222, and the lever member 221 comes into slide contact with the drive shoe 22H.

That is, the slope apparatus 11H of the present embodiment is configured such that the slide contact protruding portion 225 of the lever member 221 comes into slide contact with the cam surface 222 of the drive shoe 22H that moves in the extending direction of the guide rail 20H in a state where the slope plate 10 is deployed below the door opening portion 3. Moreover, at this time, the lever member 221 rotates as the slide contact protruding portion 225 slidably contacting the cam surface 222 is pushed upward. Furthermore, the distal end portion 221a of the lever member 221 protrudes into the driven guide portion 45H positioned above by this rotation. Thus, the slope apparatus 11H of the present embodiment is configured such that the distal end portion 221a of the lever member 221 is engaged with the driven shoe 40H.

Specifically, the driven shoe 40H of the present embodiment has a fitting member 227 provided at the rear end portion 201r of the shoe main body 201. In the driven shoe 40H of the present embodiment, the fitting member 227 has a substantially rectangular tube shape similar to the fitting member 227 provided at the intermediate position in the longitudinal direction of the shoe main body 201. Furthermore, in the slope apparatus 11H of the present embodiment, the distal end portion 221a of the lever member 221 rotated in a form pushed up by the cam surface 222 of the drive shoe 22H engages with the shoe main body 201 of the driven shoe 40H provided with the fitting member 227 from the rear end portion 20r side of the guide rail 20H. Thus, the slope apparatus 11H of the present embodiment is configured such that the movement of the driven shoe 40H toward the rear end portion 20r side of the guide rail 20H is restricted.

That is, as illustrated in FIGS. 38A, 38B, 39A, and 39B, the drive shoe 22H is allowed to move along the extending direction of the guide rail 20H also in the slope apparatus 11H of the present embodiment in a state where the movement of the driven shoe 40H toward the front end portion 20f side of the guide rail 20H is restricted by abutting on the stopper portion 64H. Moreover, at this time, the link member 25H rotates by changing the interval d between the shaft-like portion 40a of the driven shoe 40H constituting the third connection point X3 in the extending direction of the guide rail 20H and the shaft-like portion 22a of the drive shoe 22H constituting the second connection point X2 as the drive shoe 22H moves. Thus, a lift mechanism 70H capable of lifting the rear end portion 10r of the slope plate 10 upward is formed also in the slope apparatus 11H of the present embodiment based on the driving force of the drive shoe 22H that moves toward the front end portion 20f side of the guide rail 20H.

In the slope apparatus 11H of the present embodiment, the movement of the driven shoe 40H toward the rear end portion 20r side of the guide rail 20H is restricted by engaging the lever member 221 as the engagement member 210 provided on the guide rail 20H with the driven shoe 40H, in the state where the driven shoe 40H abuts on such a stopper portion 64H. Therefore, as for the driven shoe 40H, the movement position along the extending direction of the guide rail 20H is maintained even when the drive shoe 22H moves to the rear end portion 20r side of the guide rail 20H. Thus, regarding the rotation fulcrum Px of the link member 25H formed by the shaft-like portion 40a of the driven shoe 40H, the formation position Z in the extending direction of the guide rail 20H is maintained.

That is, in the slope apparatus 11H of the present embodiment, the link member 25H rotates about, as the rotation fulcrum Px, the shaft-like portion 40a of the driven shoe 40H inserted into the long hole 43 even when the drive shoe 22H moves toward the rear end portion 20r side of the guide rail 20H in a state where the slope plate 10 is deployed below the door opening portion 3. Thus, the lift mechanism 70H of the present embodiment can lower the rear end portion 10r of the slope plate 10 lifted upward.

That is, the lift mechanism 70H of the present embodiment can convert the movement of the drive shoe 22H along the extending direction of the guide rail 20H into the rotation of the link member 25H more directly as the position holding mechanism 220 holds the formation position Z of the rotation fulcrum Px. Thus, the slope apparatus 11H of the present embodiment lifts the rear end portion 10r of the slope plate 10 more smoothly based on the movement of the drive shoe 22H toward the front end portion 20f side of the guide rail 20H and the rear end portion 10r of the slope plate 10 can be lowered based on the movement of the drive shoe 22H toward the rear end portion 20r side.

In particular, when switching to the lowering operation, a force is generated to move the driven shoe 40H, which forms the rotation fulcrum Px of the link member 25H, in the extending direction of the guide rail 20H by the weight of the slope plate 10 lifted upward. Thus, in a state where the synchronization with the drive shoe 22H is broken, that is, when the link member 25H rotates without a change in the position of the drive shoe 22H, there is a possibility that the rear end portion 10r of the slope plate 10 connected to the link member 25H will fall steeply.

However, in the slope apparatus 11H of the present embodiment, a position holding mechanism 220 is formed by the stopper portion 64H that restricts movement of driven shoe 40H toward the front end portion 20f side of guide rail 20H by the contact and the engagement member 210 that restricts the movement of the driven shoe 40H toward the front end portion 20f side of the guide rail 20H by the engagement. Therefore, regardless of the movement direction of the drive shoe 22H, the formation position Z of the rotation fulcrum Px by the shaft-like portion 40a of the driven shoe 40H is maintained. Thus, the slope apparatus 11H of the present embodiment can smoothly switch to the lowering operation by maintaining the synchronization between the drive shoe 22H that moves in the extending direction of the guide rail 20H and the link member 25H that rotates in conjunction with the drive shoe 22H.

In the slope apparatus 11H of the present embodiment, the cam surface 222 provided on the shoe main body 200 of the drive shoe 22H is detached from the slide contact protruding portion 225 provided on the distal end portion 221a of the lever member 221 in succession to the lowering operation of the slope plate 10 as the drive shoe 22H moves toward the rear end portion 20r side of the guide rail 20H. Furthermore, as the lever member 221 rotates, the distal end portion 221a of the lever member 221 is detached from the shoe main body 201 of the driven shoe 40H, specifically, the rear end portion 201r of the shoe main body 201 provided with the fitting member 227 serving as the engagement portion. Thus, the slope apparatus 11H of the present embodiment is configured such that the slope plate 10 connected to the link member 25H moves toward the rear end portion 20r side of the guide rail 20H in the storing direction integrated with the drive shoe 22H while maintaining a substantially horizontal posture as the link member 25H and the driven shoe 40H move.

Figure 36:
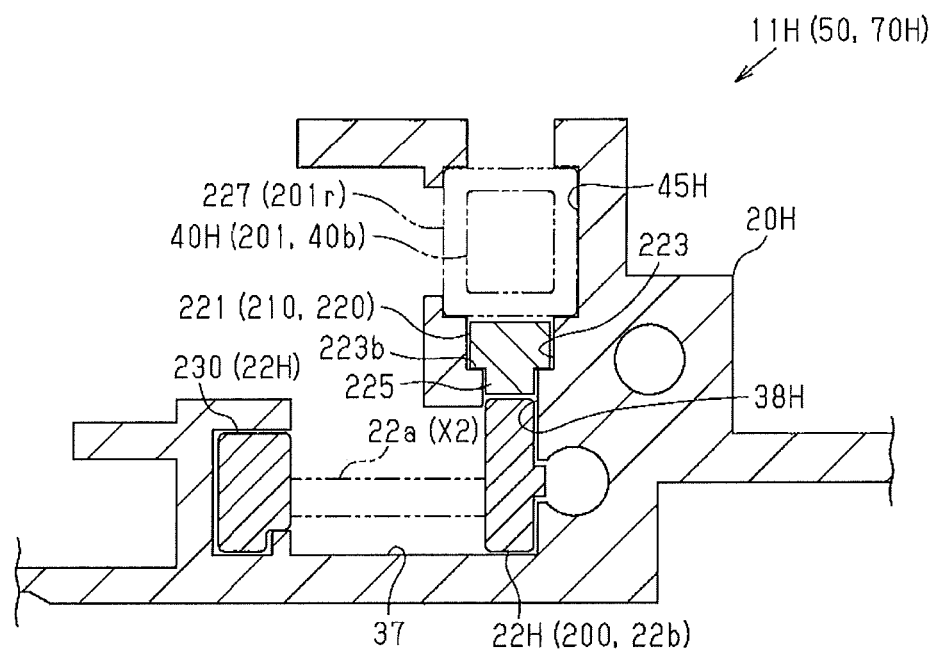
FIG. 36 is an enlarged sectional view of the vicinity of the lever member provided at the guide rail.
Figure 37:
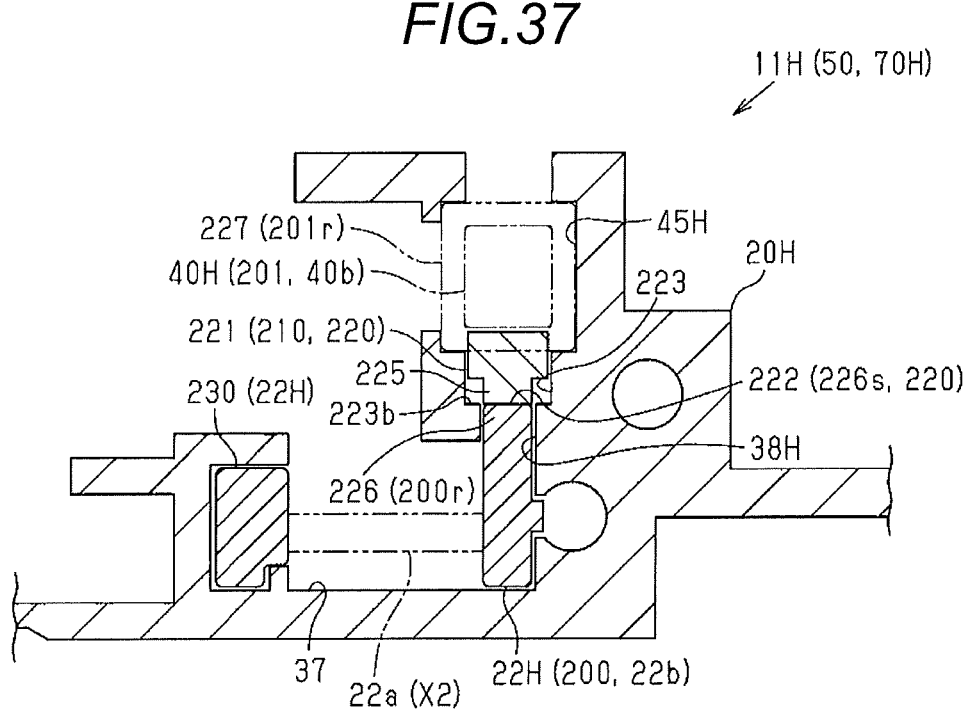
FIG. 37 is an enlarged sectional view of the vicinity of the lever member provided at the guide rail.

As illustrated in FIGS. 36 and 37, the lever member 221 has a substantially T-shaped cross-section at the distal end portion 221a having a slide contact protruding portion 225 protruding downward in the slope apparatus 11H of the present embodiment. Thus, the lever member 221 of the present embodiment is configured to engage with the bottom portion 223b of the housing recess 223 so that the distal end portion 221a does not fall into the drive guide portion 38H even after the shoe main body 200 of the drive shoe 22H moves from the lower side of the lever member 221 to the rear end portion 20r side of the guide rail 20H based on its cross-sectional shape.

Moreover, the drive shoe 22H of the present embodiment has a sub shoe 230 that has the same long and substantially flat outer shape as the shoe main body 200 and moves along the extending direction of the guide rail 20H. Furthermore, the drive shoe 22H of the present embodiment supports both ends of the shaft-like portion 22a constituting the second connection point X2 of the link member 25H with respect to the drive shoe 22H by the shoe main body 200 and the sub shoe 230. Thus, the slope apparatus 11H of the present embodiment can more stably support the slope plate 10 via the link member 25H connected to the shaft-like portion 22a.

Next, the effect of the present embodiment will be described.

(1) The lift mechanism 70H includes a position holding mechanism 220 that holds the position of the shaft-like portion 40a of the driven shoe 40H that forms the rotation fulcrum Px of the link member 25H in the extending direction of the guide rail 20H, that is, the position that holds the formation position Z of the rotation fulcrum Px in a state where the slope plate 10 is deployed.

According to the above-described configuration, the movement of the drive shoe 22H along the extending direction of the guide rail 20H can be more directly converted into the rotation of the link member 25H. Thus, the rear end portion 10r of the slope plate 10 can be lifted more smoothly based on the movement of the drive shoe 22H toward the front end portion 20f side of the guide rail 20H and the rear end portion 10r of the slope plate 10 lifted upward can be lowered more smoothly based on the movement of the drive shoe 22H toward the rear end portion 20r side of the guide rail 20H.

That is, synchronization between the drive shoe 22H that moves in the extending direction of the guide rail 20H and the link member 25H that rotates in conjunction with the drive shoe 22H can be maintained by holding the formation position Z of the rotation fulcrum Px, even when the movement direction of the drive shoe 22H is reversed. Thus, it is possible to smoothly switch between the lifting operation and the lowering operation.

(2) The slope apparatus 11H includes a stopper portion 64H that restricts the movement of the driven shoe 40H toward the front end portion 20f side of the guide rail 20H by abutting the driven shoe 40H on the slope plate 10 in the deployed state. Moreover, the slope apparatus 11H includes an engagement member 210 that restricts the movement of the driven shoe 40H toward the rear end portion 20r side of the guide rail 20H by engaging the driven shoe 40H with the slope plate 10 in the deployed state. Thus, the position holding mechanism 220 is formed by the stopper portion 64H and the engagement member 210.

According to the above-described configuration, the position holding mechanism 220 capable of holding the formation position Z of the rotation fulcrum Px by the shaft-like portion 40a of the driven shoe 40H can be formed regardless of the movement direction of the drive shoe 22H with a simple configuration.

(3) The engagement member 210 is engaged with and disengaged from the driven shoe 40H based on the movement of the drive shoe 22H along the extending direction of the guide rail 20H by coming into slide contact with the cam surface 222 provided on the drive shoe 22H while being supported by the guide rail 20H.

According to the above-described configuration, the engagement member 210 can be engaged with and disengaged from the driven shoe 40H in conjunction with the movement of the link member 25H that raises or lowers the rear end portion 10r of the slope plate 10 by the movement of the drive shoe 22H along the extending direction of the guide rail 20H. Thus, the movement of the driven shoe 40H toward the rear end portion 20r side of the guide rail 20H can be restricted and released from the restriction at an appropriate timing with a simple configuration.

Each embodiment can be changed and implemented as follows. The above embodiment and the following modification examples can be implemented in combination with each other within a technically consistent range.

In the first embodiment, the third connection point X3 of the link member 25 with respect to the driven shoe 40 is formed by inserting the shaft-like portion 40a of the driven shoe 40 through the long hole 43 provided in the link member 25. However, the configuration is not limited thereto, and the third connection point X3 may be formed by inserting a shaft-like portion provided on the link member 25 side through a long hole formed on the driven shoe 40 side.

In each of the above embodiments, the drive cable 51 has a configuration as a flat-tooth rack belt 60. However, the shape of the drive cable 51 and the drive type by the actuator 52 may be randomly changed.

As seen in the related art, a configuration may be adopted in which the drive shoe 22 is moved in the extending direction of the guide rail 20 based on a meshing relationship (screw pair) between a screw shaft that is rotated by motor driving and a nut member that is screwed to the screw shaft. Thus, the configuration in which the drive shoe 22 moves from the deploying direction of the slope plate 10, that is, from the rear end portion 20r side of the guide rail 20 to the front end portion 20f side, is not excluded based on the drive means other than motor drive, for example, the biasing force of the elastic member (such as compression spring).

A configuration in which the drive shoe 22 connected to the slope plate 10 is driven via the drive cable 51 may be applied to the slope apparatus that does not have the posture holding mechanism 50 (50B) and the lift mechanism 70 (70B and 70C) like the slope apparatus 11 (11B and 11C) of each of the above embodiments in deploying and storing the slope plate 10. Also in this case, it is preferable to have a configuration including a sliding path 58 extending along the extending direction of the guide rail 20 and an actuator 52 that causes the drive cable 51 to slide along the sliding path 58.

By adopting such a configuration, the slope plate 10 can be stably moved integrally with the drive shoe 22 in the extending direction of the guide rail 20 with a simple configuration. Thus, the apparatus can be reduced in size by utilizing the simple configuration.

In the second embodiment, as long as the third connection point X3 with respect to the driven shoe 40B functions as the rotation fulcrum Px of the link member 25, the link member 25B and the driven shoe 40B may not necessarily be configured to be relatively rotatable. That is, in a state in which the driven shoe 40B is engaged with the driven guide portion 45B, the link member 25B may be rotated integrally with the driven shoe 40B with the driven shoe 40B as a rotation fulcrum Px. Thus, in the third embodiment, the driven shoe 40C may not rotate relative to either the link member 25C or the driven guide portion 45C.

Moreover, as long as the posture of the link member 25 can be held, the configuration of the posture holding mechanism 50 may be randomly changed based on the engaged state of the link member 25 to the guide rail 20. For example, the guide rails 20B and 20C in the second and third embodiments may be configured without the top plate portion 46.

In the first embodiment, the guide rail 20 is configured such that the link member 25 abuts on the front end 46f of the top plate portion 46 when the link member 25 moves toward the rear end portion 20r side of the guide rail 20 in conjunction with the drive shoe 22 in a state where the slope plate 10 is deployed to the door opening portion 3. Thus, the front end 46f of the top plate portion 46 functions as a return fulcrum forming portion 77 that forms the second rotation fulcrum Py on the link member 25. However, the configuration is not limited thereto, and the return fulcrum forming portion 77 may be formed by a configuration other than the front end 46f of the top plate portion 46.

For example, the force in the direction of lowering the rear end portion 10r of the slope plate 10 is applied to the link member 25 by the weight of the slope plate 10 or the like. Thus, the link member 25 may be rotated around the same rotation fulcrum Px as in the lifting operation also in the operation of lowering the rear end portion 10r of the slope plate 10.

In each of the above embodiments, the first connection point X1 with respect to the rear end portion 10r of the slope plate 10 is configured to move to the rear end portion 20r side of the guide rail 20 from the rotation fulcrum Px by the rotation of the link member 25. However, the configuration is not limited thereto. For example, the amount of rotation of the link member 25 based on the movement of the drive shoe 22 toward the front end portion 20f side of the guide rail 20, such as the rotation of the link member 25, may be randomly changed to a position where the rear end portion 10r of the slope plate 10, is lifted up most.

In the third embodiment, the first connection point X1 is moved to the rear end portion 20r side of the guide rail 20 from the rotation fulcrum Px before the second connection point X2 moves beyond the rotation fulcrum Px of the link member 25C to the front end portion 20f side of the guide rail 20. However, the configuration is not limited thereto. Similar to the first and second embodiments, the first connection point X1 may be configured to move to the rear end portion 20r side of the guide rail 20 from the rotation fulcrum Px by moving the second connection point X2 to the front end portion 20f side of the guide rail 20 beyond the rotation fulcrum Px of the link member 25C. Accordingly, the rear end portion 10r of the slope plate 10 can be brought close to the edge portion 71e of the vehicle floor 71 facing the door opening portion 3 stably. Thus, for the lift mechanisms 70 and 70B in the first and second embodiments, the first connection point X1 may move to the rear end portion 20r side of the guide rail 20 with respect to the rotation fulcrum Px before the second connection point X2 moves beyond the rotation fulcrum Px of the link member 25C to the front end portion 20f side of the guide rail 20, for example, by changing the shape of the link member 25.

In each of the above embodiments, the link member 25 rotates as the drive shoe 22 moves from the rear end portion 20r side of the guide rail 20 to the front end portion 20f side in a state where the rotation fulcrum Px of the link member 25 is formed between the first connection point X1 and the second connection point X2. Thus, in the fourth embodiment, the fall-off prevention member 101 held by the side end portion 100 of the slope plate 10D is lifted above the slope plate 10D by rotating the link member 25D in the direction in which the rear end portion 10r of the slope plate 10D is lifted. However, the configuration is not limited thereto. The configuration for rotating the link member 25D may be randomly changed in the lift mechanism 70D that lifts the slope plate 10D provided with such a fall-off prevention member 101 upward.

In the fourth embodiment, each fall-off prevention member 101 is held at the side of the slope plate 10D at the side end portions 100 on both sides in the width direction of the slope plate 10D.

Figure 29:
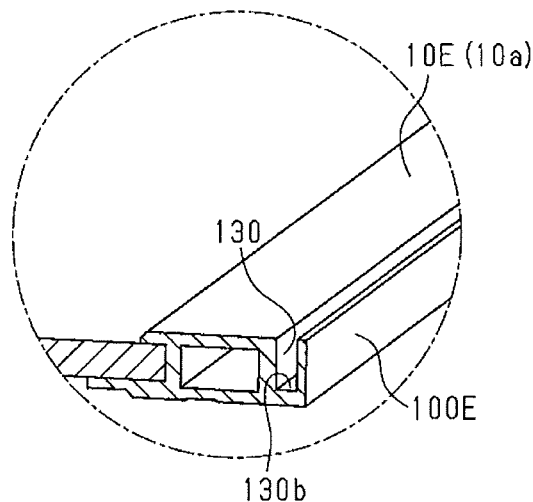
FIG. 29 is a perspective view illustrating an accommodation recessed portion of the fall-off prevention member provided at a side end portion of the slope plate.
Figure 30A:
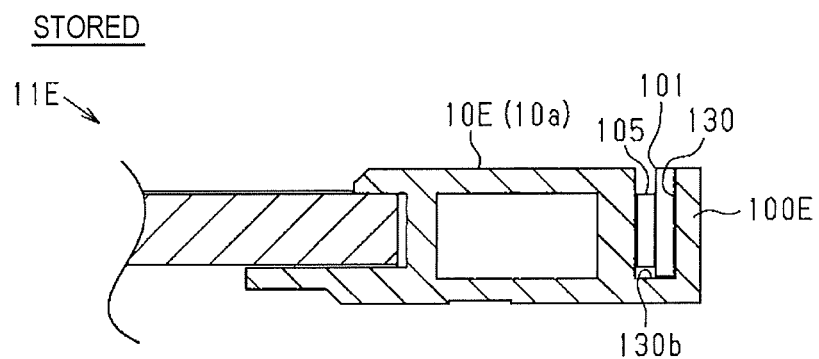
FIGS. 30A and 30B are sectional views in a vicinity of a side end portion of the slope plate provided with the accommodation recessed portion of the fall-off prevention member.
Figure 30B:
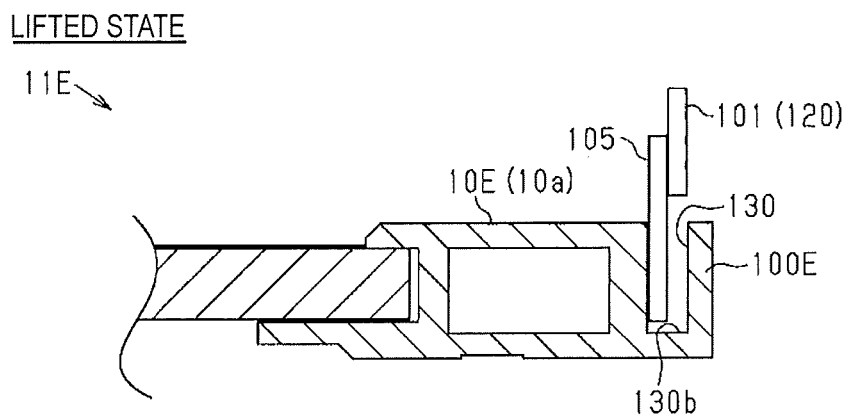

However, the configuration is not limited thereto. Like the slope apparatus 11E illustrated in FIGS. 29, 30A, and 30B, the side end portion 100E of the slope plate 10E is provided with a groove-shaped accommodation recess 130 that opens in the upper surface 10a of the slope plate 10E in a shape extending in the longitudinal direction. Thus, the fall-off prevention member 101 housed in the housing recess 130 may be lifted to the upper surface 10a side of the slope plate 10E. As a result, it is possible to protect the fall-off prevention member 101 and improve the design.

Figure 31A:
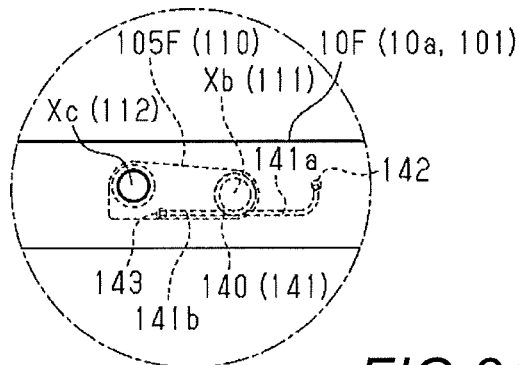
FIGS. 31A to 31C are explanatory views of an urging member interposed between the slope plate and the fall-off prevention member.
Figure 31B:
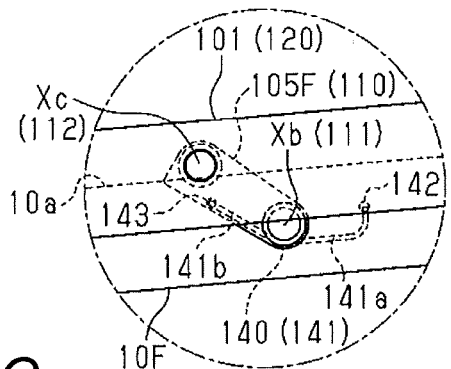
Figure 31C:
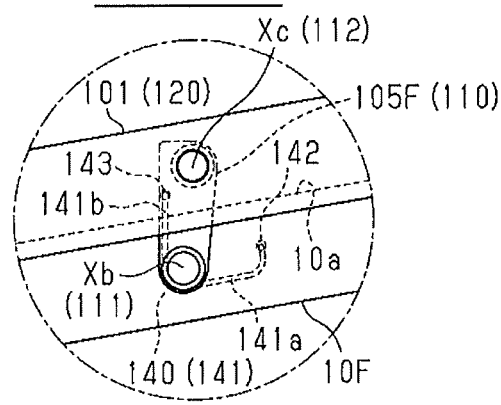

As illustrated in FIGS. 31A to 31C, a configuration provided with the urging member 140 which urges the fall-off prevention member 101 in the direction where the fall-off prevention member 101 lifts may be adopted. For example, in the example illustrated in FIGS. 31A to 31C, a torsion coil spring 141 is fitted to the shaft-like member 111 that forms the plate side connection point Xb of the second link member 105F with respect to the slope plate 10F. Furthermore, the slope plate 10F is formed with an engagement portion 142 for the first end portion 141a of the torsion coil spring 141, and the second link member 105F is formed with an engagement portion 143 for the second end portion 141b of the torsion coil spring 141. Thus, in the example illustrated in FIGS. 31A to 31C, the fall-off prevention member 101 is rotated and urged in the direction in which the fall-off prevention member 101 is lifted via the second link member 105F in the FIGS. 31A to 31C, by biasing the second link member 105F in the clockwise direction, based on the elastic force of the torsion coil spring 141.

According to the above-described configuration, the fall-off prevention member 101 extending in the longitudinal direction of the slope plate 10F can be lifted more smoothly. The number and arrangement of the urging members 140 and the types thereof may be randomly changed. For example, a spring member other than the torsion coil spring 141, such as a compression coil spring or a leaf spring, or another elastic member may be used for the urging member 140. Furthermore, the urging member 140 may be configured to directly press the fall-off prevention member 101 upward. Thus, the urging member 140 may press the fall-off prevention member 101 upward via a pressure member other than the second link member 105F.

In the fourth embodiment, a plurality of second link members 105 are interposed on the front end portion 10f side of the slope plate 10 from the first connection point X1 with respect to the link member 25D between the slope plate 10D and each fall-off prevention member 101. However, the configuration is not limited thereto. The number and arrangement of the second link members 105 may be randomly changed. Thus, the second link member 105 may be configured not to form the parallel link 110 with the first end portion 25a of each link member 25D.

Figure 32:
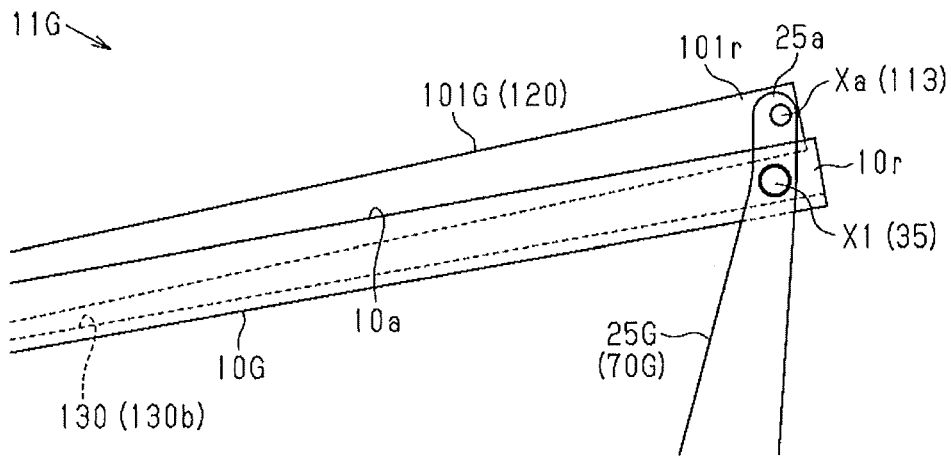
FIG. 32 is a side view of another slope apparatus.

Like a slope apparatus 11G illustrated in FIG. 32, the rear end portion 101r of each fall-off prevention member 101G may be lifted by the rotation of the link member 25G constituting the lift mechanism 70G without providing the second link member 105 as described above in a form in which each fall-off prevention member 101G is in a forward leaning posture. Thus, the movable side wall portion 120 can be deployed above the slope plate 10G With a simple configuration.

In this case, for example, a connection point between the slope plate 10G and each fall-off prevention member 101G may be formed by a long hole and a shaft member engaged with the long hole. Thus, in the configuration in which the housing recess 130 as in the above example is provided in the slope plate 10G, the front end portion of the fall-off prevention member 101G may slide on the bottom surface 130b of the housing recess 130.

In the fourth embodiment, the fall-off prevention member 101 has a long, substantially flat outer shape and extends in the longitudinal direction of the slope plate 10D. However, the configuration is not limited thereto. As long as the side wall portion 120 for preventing fall off can be formed, the shape of the fall-off prevention member 101 may be randomly changed by being lifted to the upper surface 10a side of the slope plate 10D. Thus, the length of the fall-off prevention member 101 forming the side wall portion 120 for preventing the fall-off and the amount of protruding upward of the slope plate 10D may also be randomly changed.

In the fourth embodiment, the vertical width W1 of the fall-off prevention member 101 is set to be substantially equal to the thickness W0 of the slope plate 10D, but the vertical width W1 may be randomly changed. Thus, the fall-off prevention member 101 may be configured such that a part of the fall-off prevention member 101 protrudes above the slope plate 10D together with the slope plate 10D in a state of moving in the deploying and storing directions in a substantially horizontal posture, that is, in a state before the slope plate 10D is lifted. It is preferable that the protruding amount of the fall-off prevention member 101 above the slope plate 10D before the lifting is smaller when considering the mountability for vehicle 1.

In the fifth embodiment, a lever member 221 pivotally supported with respect to the guide rail 20H engages with the rear end portion 201r of the shoe main body 201 by rotating the drive shoe 22H while being pushed up by the cam surface 222 provided on the shoe main body 200. Thus, a position holding mechanism 220 that restricts the movement of the driven shoe 40H toward the rear end portion 20r side of the guide rail 20H is formed using the lever member 221 as the engagement member 210.

However, the configuration is not limited thereto and the direction in which the cam surface 222 presses the lever member 221 may be randomly changed. For example, the lever member 221 pressed against the cam surface 222 may be engaged with the driven shoe 40H from the side. Moreover, the engagement member 210 may be configured to be pressed against the cam surface 222 and engage with the driven shoe 40H by providing the engagement member 210 supported so as to be slidable with respect to the guide rail 20H. Thus, if the engagement can restrict the movement of the driven shoe 40H toward the rear end portion 20r side of the guide rail 20H, the engagement position of the engagement member 210 with respect to the drive shoe 22H may also be randomly changed.

For example, the engagement member 210 of the position holding mechanism 220 may be provided at a location other than the guide rail 20H, such as a bracket. Furthermore, the engagement member 210 may be engaged with the driven shoe 40H by a driving method other than coming into slide contact with the cam surface 222 provided on the drive shoe 22H as described above by using electrical drive means such as solenoids, for example. Thus, the position holding mechanism 220 may be configured such that the engagement member 210 which engages with the driven shoe 40 restricts both the movement of the driven shoe 40 toward the front end portion 20f side of the guide rail 20H and the movement of the driven shoe 40 toward the rear end portion 20r side.

In the fifth embodiment, the position holding mechanism 220 is formed by restricting the movement of the driven shoe 40H along the extending direction of the guide rail 20H by the stopper portion 64H provided on the guide rail 20H and the lever member 221 as the engagement member 210. However, the configuration is not limited thereto. The position holding mechanism 220 may be formed by, for example, a constituent member of the rotation fulcrum Px provided integrally with the link member 25 being rotatably engaged with the guide rail 20H. Thereby, the structure of the applicable lift mechanism can be expanded.

A vehicular slope apparatus according to an aspect of this disclosure includes a slope plate that deploys to a lower end of a door opening portion, a guide rail that extends in a deploying and storing direction of the slope plate, a drive shoe that moves in an extending direction of the guide rail, a link member that has a first connection point rotatably connected to a rear end portion of the slope plate and a second connection point rotatably connected to the drive shoe, a posture holding mechanism configured such that the slope plate moves, based on an engaged state of the link member with respect to the guide rail, in the extending direction of the guide rail in conjunction with the drive shoe in a state of holding a posture of the link member, and a lift mechanism configured to form a rotation fulcrum of the link member between the first connection point and the second connection point and to rotate the link member by changing an interval between the rotation fulcrum and the second connection point in the extending direction of the guide rail based on the movement of the drive shoe from a rear end portion side toward a front end portion of the guide rail to thereby lift the rear end portion of the slope plate in a state in which the slope plate is deployed to the door opening portion as the rear end portion of the slope plate is moved to a front end portion of the guide rail.

According to the above-described configuration, the link member can be rotated in the direction of lifting the rear end portion of the slope plate based on the driving force of the drive shoe moving from the rear end portion side to the front end portion side of the guide rail continuing with the operation of deploying the slope plate to the door opening portion. In this case, the lifting position of the rear end portion can be randomly set based on the rotation amount of the link member and the length of the link member. Thus, the slope plate can be disposed at a position closer to the vehicle floor.

The apparatus can be reduced in size by utilizing a simple configuration. In particular, since the link member rotates in a state in which the slope plate is deployed to the door opening portion, and the lift mechanism which rotates the link member is formed based on the movement of the drive shoe along the extending direction of the guide rail, the thickness in the vertical direction can be easily reduced. Thus, the mountability with respect to the vehicle can be improved.

The vehicular slope apparatus according to the aspect of this disclosure may further include a driven shoe that moves in the extending direction of the guide rail integrally with the link member by being connected to the link member at a position between the first connection point and the second connection point, in which the lift mechanism may be configured such that the link member rotates about, as the rotation fulcrum, a third connection point at which the driven shoe is connected to the link member.

According to the above-described configuration, the link member can be stably supported by the drive shoe and the driven shoe. The link member can be stably rotated by using the third connection point formed by the driven shoe as a rotation fulcrum.

In the vehicular slope apparatus according to the aspect of this disclosure, the third connection point may be formed by inserting a shaft-like portion provided on one of the driven shoe and the link member through a long hole provided on the other of the driven shoe and the link member, and the lift mechanism may include a stopper portion that restricts the movement of the driven shoe toward the front end portion side of the guide rail by abutting on the driven shoe in a state in which the slope plate is deployed.

According to the above-described configuration, even after the driven shoe abuts on the stopper portion, at the connect portion of the link member with respect to the driven shoe, apparently, the drive shoe is allowed to move from the rear end portion side toward the front end portion of the guide rail by moving the shaft-like portion in the long hole. Thus, the link member rotates about the shaft-like portion inserted through the long hole as a fulcrum. That is, by moving the drive shoe along the extending direction of the guide rail in a state in which the movement of the driven shoe is restricted, the interval between the rotation fulcrum of the link member in the extending direction and the second connection point with respect to the drive shoe changes. Thus, the link member engaged with the guide rail can be stably rotated via the drive shoe and the driven shoe.

In the vehicular slope apparatus according to the aspect of this disclosure, the guide rail may be provided with a driven guide portion that engages with the driven shoe to guide the driven shoe in the extending direction of the guide rail, and the lift mechanism may be formed by forming a curved portion that extends upward from the rear end portion side toward the front end portion side of the guide rail in the driven guide portion at the front end portion of the guide rail.

According to the above-described configuration, when the slope plate is in a state deployed to the door opening portion, the driven shoe moves in the extending direction of the guide rail in conjunction with the drive shoe while being displaced in the vertical direction by being guided by the curved portion provided in the driven guide portion at the front end portion of the guide rail. Accordingly, the interval between the third connection point and the second connection point of the link member in the extending direction of the guide rail changes. Thus, based on the movement of the drive shoe from the rear end portion side toward the front end portion side of the guide rail, the link member can be rotated in a direction in which the rear end portion of the slope plate is lifted upward with the third connection point as a rotation fulcrum.

In the vehicular slope apparatus according to the aspect of this disclosure, the lift mechanism may include an abutting member that forms the rotation fulcrum at an abutting portion of the link member by abutting on the link member toward the front end portion side of the guide rail in a state in which the slope plate is deployed.

According to the above-described configuration, when the link member moves to the front end portion side of the guide rail in a state of abutting on the abutting member, the abutting position of the link member with respect to the abutting member also moves. Accordingly, the interval between the abutting portion of the link member with respect to the abutting member and the second connection point with respect to the drive shoe in the guide rail extending direction changes. Thus, the link member can be rotated in a direction in which the rear end portion of the slope plate is lifted upward with the abutting portion of the link member with respect to the abutting member as a rotation fulcrum based on the movement of the drive shoe from the rear end portion side toward the front end portion side of the guide rail.

In the vehicular slope apparatus according to the aspect of this disclosure, the lift mechanism may include a return fulcrum forming portion that abuts on the link member and forms a second rotation fulcrum at the link member as the link member moves toward the rear end portion side of the guide rail in conjunction with the drive shoe in a state in which the slope plate is deployed.

According to the above-described configuration, the link member can be stably rotated in the direction of lowering the rear end portion of the slope plate based on the movement of the drive shoe toward the rear end portion side of the guide rail. In succession to this lowering operation, the slope plate can be moved in the storing direction integrally with the link member.

In the vehicular slope apparatus according to the aspect of this disclosure, the lift mechanism may include a position holding mechanism that holds a formation position of the rotation fulcrum in the extending direction of the guide rail in a state in which the slope plate is deployed.

According to the above-described configuration, the movement of the drive shoe along the extending direction of the guide rail can be more directly converted into the rotation of the link member. Thus, the rear end portion of the slope plate can be lifted more smoothly based on the movement of the drive shoe toward the front end portion side of the guide rail, and the rear end portion of the slope plate lifted upward can be lowered based on the movement of the drive shoe toward the rear end portion side of the guide rail.

That is, by holding the formation position of the rotation fulcrum, the synchronization between the drive shoe that moves in the extending direction of the guide rail and the link member that rotates in conjunction with the drive shoe can be maintained even when the movement direction of the drive shoe is reversed. Thus, it is possible to smoothly switch between the lifting operation and the lowering operation.

In the vehicular slope apparatus according to the aspect of this disclosure, the lift mechanism may include a position holding mechanism that holds a formation position of the rotation fulcrum in the extending direction of the guide rail in a state in which the slope plate is deployed, the third connection point serving as the rotation fulcrum may be formed by inserting a shaft-like portion provided at the driven shoe through a long hole provided in the link member, and the position holding mechanism may include a stopper portion that restricts the movement of the driven shoe toward the front end portion side of the guide rail by abutting on the driven shoe in a state in which the slope plate is deployed, and an engagement member that restricts the movement of the driven shoe toward the rear end portion side of the guide rail by engaging with the driven shoe in a state in which the slope plate is deployed.

According to the above-described configuration, it is possible to form a position holding mechanism that can hold the formation position of the rotation fulcrum by the shaft-like portion of the driven shoe regardless of the movement direction of the drive shoe with a simple configuration.

In the vehicular slope apparatus according to the aspect of this disclosure, the engagement member may be engaged with and disengaged from the driven shoe based on the movement of the drive shoe along the extending direction of the guide rail by coming into slide contact with a cam surface provided at the drive shoe in a state of being supported by the guide rail.

According to the above-described configuration, the engagement member can be engaged with and disengaged from the driven shoe in conjunction with the operation of the link member that lifts or lowers the rear end portion of the slope plate by the movement of the drive shoe along the extending direction of the guide rail. Thus, with a simple configuration, the movement of the driven shoe toward the rear end portion side of the guide rail can be restricted and the restriction can be canceled at an appropriate timing.

In the vehicular slope apparatus according to the aspect of this disclosure, the lift mechanism may be configured such that the first connection point moves to the rear end portion side of the guide rail from the rotation fulcrum by the rotation of the link member.

According to the above-described configuration, the rear end portion of the slope plate can be brought closer to the edge portion of the vehicle floor facing the door opening portion from the direction in which the slope plate is deployed to the door opening portion, that is, from the direction in which the door opening portion opens to the outside of the vehicle. Thus, the slope plate can be disposed at a position closer to the vehicle floor.

In the vehicular slope apparatus according to the aspect of this disclosure, the rear end portion of the slope plate may be provided with an engagement portion which engages with an edge portion of a vehicle floor facing the door opening portion in a state in which the rear end portion of the slope plate is lifted upward by the rotation of the link member.

According to the above-described configuration, the load on the slope plate can be supported by the vehicle floor. Thus, the load on the lift mechanism can be reduced to ensure high reliability and durability.

In the vehicular slope apparatus according to the aspect of this disclosure, at a second end portion of the link member provided with the second connection point, a rotation restricting portion may be provided which restricts the rotation of the link member by abutting from above on a bottom plate portion provided in the guide rail in a state in which the rear end portion of the slope plate is lifted upward by the rotation of the link member.

According to the above-described configuration, the rotation amount of the link member can be defined with a simple configuration. Thus, the slope plate can be disposed at a position closer to the vehicle floor. In addition, the load applied to the link member can be supported by the bottom plate portion of the guide rail on which the rotation restricting portion abuts. Thus, high reliability and durability can be ensured.

The vehicular slope apparatus according to the aspect of this disclosure may further include a drive cable that is connected to the drive shoe, a sliding path that extends along the extending direction of the guide rail, and an actuator that causes the drive cable to slide along the sliding path.

According to the above-described configuration, the drive shoe can be stably moved in the extending direction of the guide rail with a simple configuration. Moreover, the mountability with respect to a vehicle can be improved by taking advantage of the simple configuration and reducing the size.

The vehicular slope apparatus according to the aspect of this disclosure may further include a fall-off prevention member that has a rotation connection point with the link member at a position closer to a tip end side from the first connection point at a first end portion of the link member provided with the first connection point with respect to the slope plate and is held at a side end portion of the slope plate, in which the fall-off prevention member may be configured to be lifted to an upper surface side of the slope plate by rotating the link member in a direction in which the rear end portion of the slope plate is lifted.

According to the above-described configuration, the fall-off prevention member lifted above the upper surface of the slope plate forms the side wall portion, so that an object moving on the slope plate is difficult to fall off from the slope plate. Furthermore, when the slope plate is stored, the fall-off prevention member held at the side end portion does not protrude upward from the upper surface of the slope plate, or the protruding amount can be suppressed. Thus, the mountability with respect to the vehicle can be improved.

The vehicular slope apparatus according to the aspect of this disclosure may further include a second link member that forms a parallel link together with the first end portion of the link member having the first connection point with respect to the slope plate and the rotation connection point with the fall-off prevention member by being rotatably connected to the slope plate and being rotatably connected to the fall-off prevention member.

According to the above-described configuration, the fall-off prevention member can be lifted while maintaining the posture of the fall-off prevention member. Thus, it is possible to ensure the high designability while improving the function as the side wall portion for the fall-off prevention.

In the vehicular slope apparatus according to the aspect of this disclosure, the rotation connection point with the fall-off prevention member may be located above the first connection point with respect to the slope plate.

According to the above-described configuration, when the link member rotates in the direction of lifting the rear end portion of the slope plate, a catch hardly occurs at the rotation connection point with the fall-off prevention member. Thus, the fall-off prevention member held on the side end portion of the slope plate can be lifted more smoothly based on the rotation of the link member.

In the vehicular slope apparatus according to the aspect of this disclosure, the slope plate may be provided with an accommodation recessed portion that opens to an upper surface of the slope plate and accommodates the fall-off prevention member.

According to the above-described configuration, the designability can be improved while protecting the fall-off prevention member.

The vehicular slope apparatus according to the aspect of this disclosure may further include an urging member that urges the fall-off prevention member in a direction in which the fall-off prevention member is lifted.

According to the above-described configuration, the fall-off prevention member extending in the longitudinal direction of the slope plate can be lifted upward more smoothly based on the rotation of the link member.

According to the aspect of this disclosure, the slope plate can be disposed closer to the vehicle floor.

Next, the technical idea that can be grasped from the embodiment and the modified examples will be described.

(A) A vehicular slope apparatus in which the posture holding mechanism holds the link member in a posture in which the first connection point is disposed above the second connection point and in the deploying direction of the slope plate.

According to the above-described configuration, the link member can be rotated in the direction of lifting the rear end portion of the slope plate by immediately forming a rotation fulcrum between the first connection point and the second connection point based on the movement of the drive shoe toward the front end portion side of the guide rail continuing with the operation of deploying the slope plate to the door opening portion.

(B) In the vehicular slope apparatus, the guide rail includes a drive guide portion for guiding the drive shoe in the extending direction of the guide rail by engaging with the drive shoe and a driven guide portion for guiding the driven shoe in the extending direction of the guide rail by engaging with the driven shoe.

According to the above-described configuration, the drive shoe and the driven shoe can be moved stably in the extending direction of the guide rail. Then, the posture of the link member can be stabilized by engaging the link member with the guide rail via the drive shoe and the driven shoe.

(C) In the vehicular slope apparatus, the guide rail includes a top plate portion that extends in the extending direction of the guide rail above the drive guide portion, and the posture holding mechanism holds the posture of the link member in a state where the first end portion of the link member provided with the first connection point comes into slide contact with the lower surface of the top plate portion.

That is, the rotation of the link member in the direction in which the rear end portion of the slope plate connected to the first end portion is lifted can be restricted when the first end portion of the link member comes into slide contact with the lower surface of the top plate portion. Thus, the posture of the link member can be maintained with a simple configuration.

(D) In the vehicular slope apparatus, the guide rail is configured such that the first end portion of the link member is detached from the top plate portion in a state where the drive shoe is engaged with the drive guide portion by moving the drive shoe to the front end portion of the guide rail.

According to the above-described configuration, the link member can be largely rotated while suppressing the length at which the front end portion of the guide rail protrudes from a storage portion such as a so-called storing box provided on the vehicle body in a state where the slope plate is deployed to the door opening portion. Thus, the slope plate can be disposed at a position closer to the vehicle floor.

(E) In the vehicular slope apparatus, the guide rail is configured such that the link member abuts on a front end of the top plate portion when the link member moves toward the rear end portion side of the guide rail in conjunction with the drive shoe in a state where the slope plate is deployed.

According to the above-described configuration, the front end of the top plate portion functions as a return fulcrum forming portion that forms a second rotation fulcrum on the link member. Furthermore, as the link member rotates in conjunction with the drive shoe and moves to the rear end portion side of the guide rail, the abutting position of the top plate portion with respect to the front end moves to the first end portion side. Thus, when the first end portion of the link member comes into slide contact with the lower surface of the top plate portion, the posture holding mechanism based on the engaged state of the link member with respect to each guide rail functions again. Thereby, according to the above-described configuration, the slope plate can be moved in the storing direction more smoothly and continuously with the lowering operation of the rear end portion.

(F) The vehicular slope apparatus includes a slope support portion having a rotating member that abuts on the lower surface of the slope plate when the slope plate moves in the extending direction of the guide rail in conjunction with the drive shoe. Thereby, the slope plate can be moved in the deploying and storing directions with a stable posture.

(G) In the vehicular slope apparatus, the second connection point is configured to move to the front end portion side of the guide rail beyond the rotation fulcrum based on the movement of the driven shoe toward the front end side of the guide rail. Thereby, the first connection point of the link member with respect to the rear end portion of a slope plate can be moved to the rear-end part side of a guide rail rather than the rotation fulcrum.

(H) In the vehicular slope apparatus, the posture holding mechanism holds the posture of the link member based on the engaged state of the link member with the guide rail via the drive shoe and the driven shoe. Thereby, with a simple structure, the posture of the link member can be held stably, and a slope plate can be moved to the deploying and storing direction integrally with the link member.

(I) The vehicular slope apparatus includes a slope plate deployed to the lower end of the door opening portion, a guide rail extending in the deploying and storing direction of the slope plate, a drive shoe that moves in the extending direction of the guide rail while being connected to the slope plate, a drive cable connected to the drive shoe, a sliding path extending along the extending direction of the guide rail, and an actuator that causes the drive cable to slide along the sliding path.

According to the above-described configuration, the slope plate can be stably moved in the extending direction of the guide rail together with the drive shoe with a simple configuration. Moreover, the mountability with respect to a vehicle can be improved by taking advantage of the simple configuration and reducing the size.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicular slope apparatus comprising:
a slope plate that deploys to a lower end of a door opening portion;
a guide rail that extends in a deploying and storing direction of the slope plate;
a drive shoe that moves in an extending direction of the guide rail;
a link member that has a first connection point rotatably connected to a rear end portion of the slope plate and a second connection point rotatably connected to the drive shoe;
a posture holding mechanism configured such that the slope plate moves, based on an engaged state of the link member with respect to the guide rail, in the extending direction of the guide rail in conjunction with the drive shoe in a state of holding a posture of the link member; and
a lift mechanism configured to form a rotation fulcrum of the link member between the first connection point and the second connection point and to rotate the link member by changing an interval between the rotation fulcrum and the second connection point in the extending direction of the guide rail based on the movement of the drive shoe from a rear end portion side toward a front end portion of the guide rail to thereby lift the rear end portion of the slope plate in a state in which the slope plate is deployed to the door opening portion as the rear end portion of the slope plate is moved to a front end portion of the guide rail.

2. The vehicular slope apparatus according to claim 1, further comprising:
a driven shoe that moves in the extending direction of the guide rail integrally with the link member by being connected to the link member at a position between the first connection point and the second connection point, wherein
the lift mechanism is configured such that the link member rotates about, as the rotation fulcrum, a third connection point at which the driven shoe is connected to the link member.

3. The vehicular slope apparatus according to claim 2, wherein
the third connection point is formed by inserting a shaft-like portion provided on one of the driven shoe and the link member through a long hole provided on the other of the driven shoe and the link member, and
the lift mechanism includes a stopper portion that restricts the movement of the driven shoe toward the front end portion side of the guide rail by abutting on the driven shoe in a state in which the slope plate is deployed.

4. The vehicular slope apparatus according to claim 2, wherein
the guide rail is provided with a driven guide portion that engages with the driven shoe to guide the driven shoe in the extending direction of the guide rail, and
the lift mechanism is formed by forming a curved portion that extends upward from the rear end portion side toward the front end portion side of the guide rail in the driven guide portion at the front end portion of the guide rail.

5. The vehicular slope apparatus according to claim 1, wherein
the lift mechanism includes an abutting member that forms the rotation fulcrum at an abutting portion of the link member by abutting on the link member toward the front end portion side of the guide rail in a state in which the slope plate is deployed.

6. The vehicular slope apparatus according to claim 1, wherein
the lift mechanism includes a return fulcrum forming portion that abuts on the link member and forms a second rotation fulcrum at the link member as the link member moves toward the rear end portion side of the guide rail in conjunction with the drive shoe in a state in which the slope plate is deployed.

7. The vehicular slope apparatus according to claim 1, wherein
the lift mechanism includes a position holding mechanism that holds a formation position of the rotation fulcrum in the extending direction of the guide rail in a state in which the slope plate is deployed.

8. The vehicular slope apparatus according to claim 2, wherein
the lift mechanism includes a position holding mechanism that holds a formation position of the rotation fulcrum in the extending direction of the guide rail in a state in which the slope plate is deployed,
the third connection point serving as the rotation fulcrum is formed by inserting a shaft-like portion provided at the driven shoe through a long hole provided in the link member, and
the position holding mechanism includes
a stopper portion that restricts the movement of the driven shoe toward the front end portion side of the guide rail by abutting on the driven shoe in a state in which the slope plate is deployed, and
an engagement member that restricts the movement of the driven shoe toward the rear end portion side of the guide rail by engaging with the driven shoe in a state in which the slope plate is deployed.

9. The vehicular slope apparatus according to claim 8, wherein
the engagement member is engaged with and disengaged from the driven shoe based on the movement of the drive shoe along the extending direction of the guide rail by coming into slide contact with a cam surface provided at the drive shoe in a state of being supported by the guide rail.

10. The vehicular slope apparatus according to claim 1, wherein
the lift mechanism is configured such that the first connection point moves to the rear end portion side of the guide rail from the rotation fulcrum by the rotation of the link member.

11. The vehicular slope apparatus according to claim 1, wherein
the rear end portion of the slope plate is provided with an engagement portion which engages with an edge portion of a vehicle floor facing the door opening portion in a state in which the rear end portion of the slope plate is lifted upward by the rotation of the link member.

12. The vehicular slope apparatus according to claim 1, wherein
at a second end portion of the link member provided with the second connection point, a rotation restricting portion is provided which restricts the rotation of the link member by abutting from above on a bottom plate portion provided in the guide rail in a state in which the rear end portion of the slope plate is lifted upward by the rotation of the link member.

13. The vehicular slope apparatus according to claim 1, further comprising:
a drive cable that is connected to the drive shoe;
a sliding path that extends along the extending direction of the guide rail; and
an actuator that causes the drive cable to slide along the sliding path.

14. The vehicular slope apparatus according to claim 1, further comprising:
a fall-off prevention member that has a rotation connection point with the link member at a position closer to a tip end side from the first connection point at a first end portion of the link member provided with the first connection point with respect to the slope plate and is held at a side end portion of the slope plate, wherein
the fall-off prevention member is configured to be lifted to an upper surface side of the slope plate by rotating the link member in a direction in which the rear end portion of the slope plate is lifted.

15. The vehicular slope apparatus according to claim 14, further comprising:
a second link member that forms a parallel link together with the first end portion of the link member having the first connection point with respect to the slope plate and the rotation connection point with the fall-off prevention member by being rotatably connected to the slope plate and being rotatably connected to the fall-off prevention member.

16. The vehicular slope apparatus according to claim 14, wherein
the rotation connection point with the fall-off prevention member is located above the first connection point with respect to the slope plate.

17. The vehicular slope apparatus according to claim 14, wherein
the slope plate is provided with an accommodation recessed portion that opens to an upper surface of the slope plate and accommodates the fall-off prevention member.

18. The vehicular slope apparatus according to claim 14, further comprising:
an urging member that urges the fall-off prevention member in a direction in which the fall-off prevention member is lifted.

* * * * *